US012474249B2

(12) United States Patent
Wang et al.

(10) Patent No.: US 12,474,249 B2
(45) Date of Patent: Nov. 18, 2025

(54) ASSESSING AND REDUCING DEPOSITION OF SCALES AND OTHER SOLIDS

(71) Applicant: Chevron U.S.A. Inc., San Ramon, CA (US)

(72) Inventors: Wei Wang, Houston, TX (US); Wei Wei, Sugar Land, TX (US); Chao Yan, Sugar Land, TX (US); Gregory A. Winslow, Houston, TX (US); Xinghui Liu, Houston, TX (US); Oya Aysen Karazincir, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 267 days.

(21) Appl. No.: 17/976,171

(22) Filed: Oct. 28, 2022

(65) Prior Publication Data

US 2023/0135692 A1    May 4, 2023

Related U.S. Application Data

(60) Provisional application No. 63/273,774, filed on Oct. 29, 2021.

(51) Int. Cl.
*G01N 15/06* (2024.01)
*G01N 15/00* (2024.01)

(52) U.S. Cl.
CPC . *G01N 15/0606* (2013.01); *G01N 2015/0053* (2013.01)

(58) Field of Classification Search
CPC ....... G01N 15/0606; G01N 2015/0053; G01N 15/04; G01N 2015/0092; C02F 1/008;
(Continued)

(56) References Cited

U.S. PATENT DOCUMENTS 9,840,898 B2    12/2017    Kasevich et al.
11,137,334 B2    10/2021    Karazincir et al.
(Continued)

FOREIGN PATENT DOCUMENTS

CN    102590888 A    *    7/2012    ........... E21B 43/267

OTHER PUBLICATIONS

Muryanto, Stefanus, et al. "Development of a versatile laboratory project for scale formation and control." Education for Chemical Engineers 7.3 (2012): e78-e84. (Year: 2012).*
(Continued)

*Primary Examiner* — Timothy P Graves
(74) *Attorney, Agent, or Firm* — Smith & Woldesenbet Law Group, PLLC

(57) ABSTRACT

A method for evaluating a fluid to reduce a deposition of a solid within a fractured subterranean formation may include obtaining information about materials inside of a testing vessel, where the materials are designed to be representative of the fractured subterranean formation. The method may also include providing a fluid that flows through the materials inside the testing vessel for a period of time, where the testing vessel is subjected to conditions designed to be representative of downhole conditions of the fractured subterranean formation. The method may also include evaluating the material to characterize the deposition of the solid on at least some of the materials after the period of time.

19 Claims, 16 Drawing Sheets

(58) Field of Classification Search
CPC .. C02F 5/00; C02F 2209/006; C02F 2209/02; C02F 2209/03; C02F 2209/40; C02F 2303/14; C02F 2303/22; C09K 8/524; C09K 8/528; E21B 47/006; E21B 43/25; E21B 43/26
USPC .................. 73/61.62, 38, 61.41; 166/250.05
See application file for complete search history.

(56) References Cited

U.S. PATENT DOCUMENTS

2012/0180551 A1* 7/2012 Reyes .................... G01N 15/00
73/61.71
2021/0131250 A1 5/2021 Singh et al.

OTHER PUBLICATIONS

Ezzat, Abdalla Moustafa, Medhat Gamal, and Stefano D'Angelo. "High density brine-based drill-in fluid improved reservoir producibility in gas field offshore Egypt." SPE North Africa Technical Conference and Exhibition. SPE, 2008. (Year: 2008).*

* cited by examiner

ASSESSING AND REDUCING DEPOSITION OF SCALES AND OTHER SOLIDS

CROSS-REFERENCE TO RELATED APPLICATIONS

This application claims priority to U.S. Provisional Patent Application Ser. No. 63/273,774 titled "Assessing and Reducing Deposition of Scales and Other Solids" and filed on Oct. 29, 2021, the entire contents of which are hereby incorporated herein by reference.

TECHNICAL FIELD

The present application is related to subterranean field operations and, more particularly, to assessing and reducing deposition of scales and/or other solids.

BACKGROUND

Some subterranean formations, such as shale, may produce subterranean resources through techniques such as horizontal drilling and fracturing. Over time, the fractures may become restricted or blocked. Preventing or reducing the development and growth of these restrictions or blockages may lead to enhanced extraction of the subterranean resources for an extended period of time.

SUMMARY

In general, in one aspect, the disclosure relates to a method for evaluating a fluid to reduce a deposition of a solid within a fractured subterranean formation. The method may include obtaining information about a plurality of materials inside of a testing vessel, where the plurality of materials is designed to be representative of the fractured subterranean formation. The method may also include providing a fluid that flows through the plurality of materials inside the testing vessel for a period of time, where the testing vessel is subjected to conditions designed to be representative of downhole conditions of the fractured subterranean formation. The method may further include evaluating the plurality of materials to characterize the deposition of the solid on at least some of the plurality of materials after the period of time.

In another aspect, the disclosure relates to a system for evaluating a fluid to reduce a deposition of a solid within a fractured subterranean formation. The system may include a testing module that includes a testing vessel, where the testing vessel is configured to receive a plurality of materials, where the plurality of materials is designed to be representative of the fractured subterranean formation, where the testing module is configured to be representative of downhole conditions at the fractured subterranean formation on the testing vessel, and where the testing module is further configured to provide the fluid that flows through the plurality of materials in the testing vessel for a period of time.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
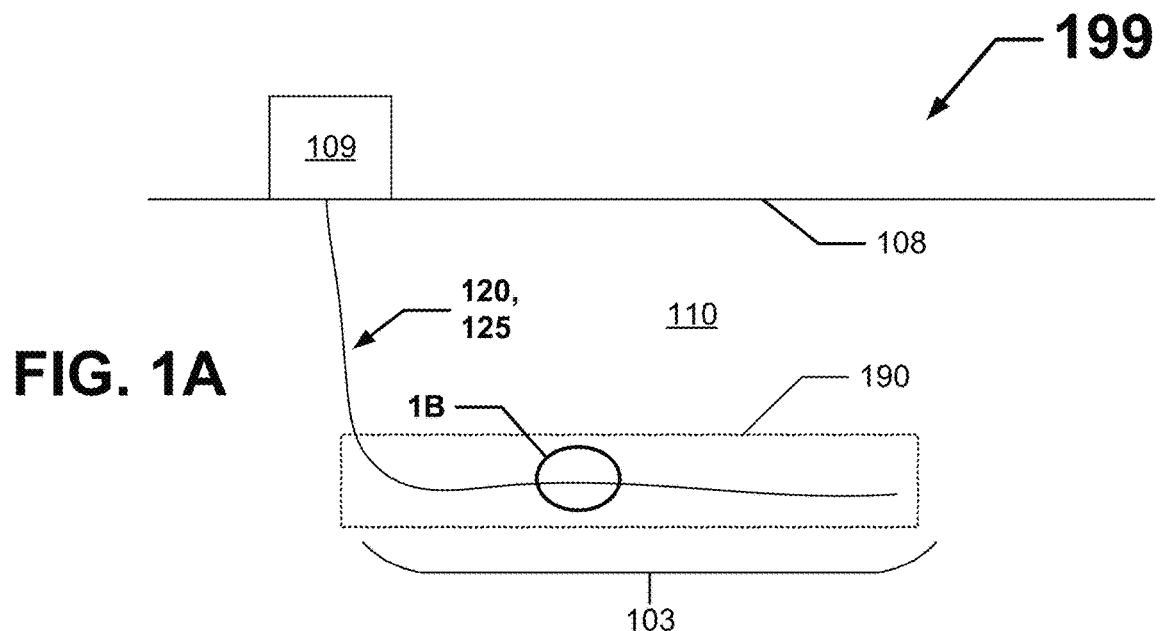
FIGS. 1A through 1C show a field system, and details thereof, with which example embodiments may be used.

The example embodiments discussed herein are directed to systems, apparatus, methods, and devices for assessing and reducing deposition of scales and/or solids (e.g., asphaltenes, sludge, fines). As defined herein, reducing deposition of scales and/or other solids may involve any of a number of different actions. For example, reducing deposition of scales and/or other solids may include minimizing the accumulation or deposition of scales and/or other solids without completely eliminating the scales and/or other solids. As another example, reducing deposition of scales and/or other solids as defined herein may additionally or alternatively mean preventing the development of scales and/or other solids. As yet another example, reducing deposition of scales and/or other solids as defined herein may additionally or alternatively mean completely eliminating scales and/or other solids that have previously developed.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional (e.g., a permeability of less than 25 millidarcy (mD) such as a permeability of from 0.000001 mD to 25 mD)), diatomite, geothermal, mineral, etc. The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for exploration and/or recovery of resources. A plurality of wells (e.g., tens to hundreds of wells) or a plurality of wellbores are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include a plurality of components, such as, but not limited to, a casing, a liner, a tubing string, a sensor, a packer, a screen, a gravel pack, artificial lift equipment (e.g., an electric submersible pump (ESP)), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof. In some embodiments, the same control devices may be used to control fluid flow into and out of the well. In some embodiments, different control devices may be used to control fluid flow into and out of a well. In some embodiments, the rate of flow of fluids through the well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" is not limited to any description or configuration described herein.

Example embodiments of assessing and reducing deposition of scales and/or other solids may be at a subsurface (e.g., propped fractures, frac face, in or near perforations, within and adjacent to a wellbore in a subterranean formation). Example embodiments of assessing and reducing deposition of scales and/or other solids may additionally or alternatively be used in any of a number of other applications. For instance, example embodiments may be used to reduce deposition of scales and/or other solids in production facilities. Such production facilities may include, but are not limited to, production tubing, heat exchangers, and conduit or other pipes (e.g., a pipeline) used to transport fluid (e.g., produced fluids from oil and gas wells).

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure may be inferred to that component. Conversely, if a component in a figure is labeled but not described, the description for such component may be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of assessing and reducing deposition of scales and/or other solids will be described more fully hereinafter with reference to the accompanying drawings, in which example embodiments of assessing and reducing deposition of scales and/or other solids are shown. Assessing and reducing deposition of scales and/or other solids may, however, be embodied in many different forms and should not be construed as limited to the example embodiments set forth herein. Rather, these example embodiments are provided so that this disclosure will be thorough and complete, and will fully convey the scope of assessing and reducing deposition of scales and/or other solids to those of ordinary skill in the art. Like, but not necessarily the same, elements (also sometimes called components) in the various figures are denoted by like reference numerals for consistency.

Terms such as "first", "second", "outer", "inner", "top", "bottom", "above", "below", "distal", "proximal", "front,", "rear," "left," "right," "on", and "within", when present, are used merely to distinguish one component (or part of a component or state of a component) from another. This list of terms is not exclusive. Such terms are not meant to denote a preference or a particular orientation, and they are not meant to limit embodiments of assessing and reducing deposition of scales and/or other solids. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
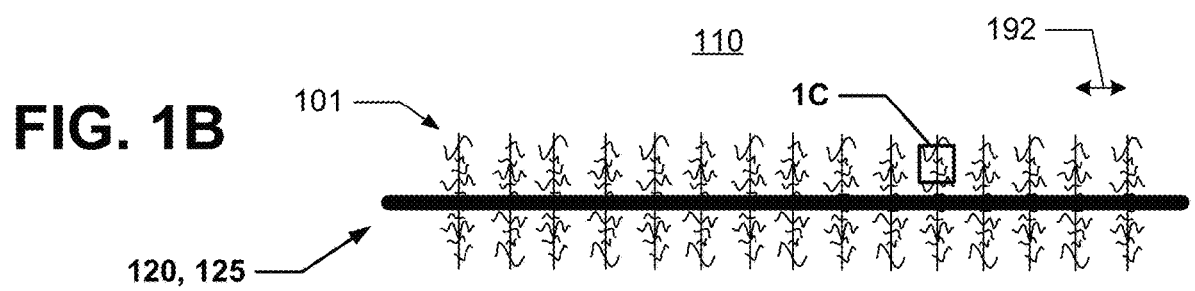
Figure 1C:
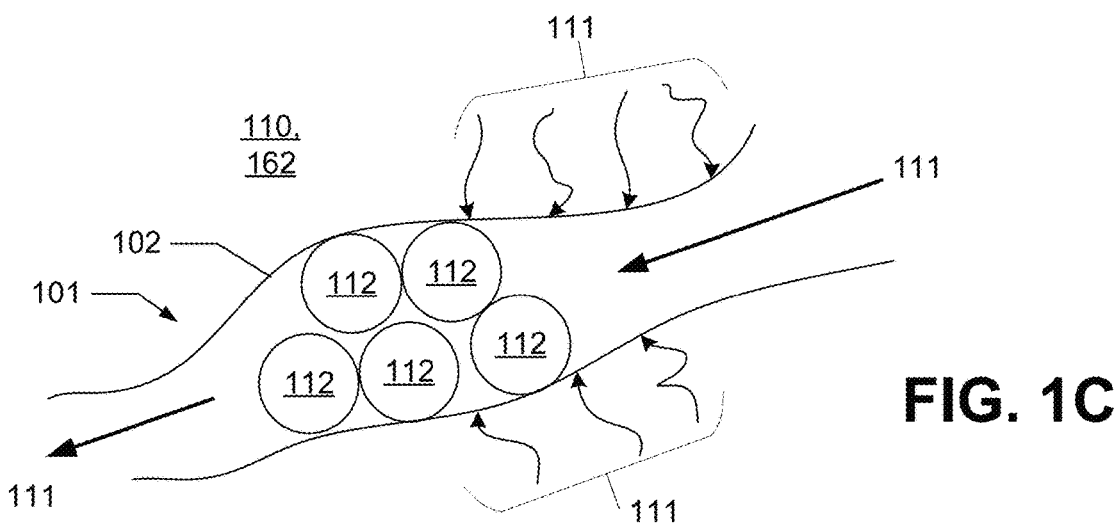

FIGS. 1A through 1C show a field system 199, including details thereof, with which example embodiments may be used. Specifically, FIG. 1A shows a schematic diagram of a land-based field system 199 in which a wellbore 120 has been drilled in a subterranean formation 110. FIG. 1B shows a detail of a substantially horizontal section 103 of the wellbore 120 of FIG. 1A. FIG. 1C shows a detail of an induced fracture 101 of FIG. 1B. The field system 199 in this example includes a wellbore 120 disposed in a subterranean formation 110 using field equipment 109 (e.g., a derrick, a tool pusher, a clamp, a tong, drill pipe, casing pipe, a drill bit, a wireline tool, a fluid pumping system) located above a surface 108 and within the wellbore 120. Once the wellbore 120 is drilled, a casing string 125 is inserted into the wellbore 120 to stabilize the wellbore 120 and allow for the extraction of subterranean resources (e.g., natural gas, oil) from the subterranean formation 110.

The surface 108 may be ground level for an onshore application and the sea floor/lakebed for an offshore application. For offshore applications, at least some of the field equipment may be located on a platform that sits above the water level. The point where the wellbore 120 begins at the surface 108 may be called the wellhead. While not shown in FIGS. 1A and 1B, there may be multiple wellbores 120, each with its own wellhead but that is located close to the other wellheads, drilled into the subterranean formation 110 and having substantially horizontal sections 103 that are close to each other. In such a case, the multiple wellbores 120 may be drilled at the same pad or at different pads. When the drilling process is complete, other operations, such as fracturing operations, may be performed. The fractures 101 are shown to be located in the horizontal section 103 of the wellbore 120 in FIG. 1B. The fractures 101, whether induced and/or naturally occurring, may additionally or alternatively be located in other sections (e.g., a substantially vertical section, a transition area between a vertical section and a horizontal section) of the wellbore 120. Example embodiments may be used along any portion of the wellbore 120 where fractures 101 are located.

The subterranean formation 110 may include one or more of a number of formation types, including but not limited to shale, limestone, sandstone, clay, sand, and salt. In certain embodiments, a subterranean formation 110 may include one or more reservoirs in which one or more resources (e.g., oil, natural gas, water, steam) may be located. One or more of a number of field operations (e.g., fracturing, coring, tripping, drilling, setting casing, extracting downhole resources) may be performed to reach an objective of a user with respect to the subterranean formation 110.

The wellbore 120 may have one or more of a number of segments or hole sections, where each segment or hole section may have one or more of a number of dimensions. Examples of such dimensions may include, but are not limited to, a size (e.g., diameter) of the wellbore 120, a curvature of the wellbore 120, a total vertical depth of the wellbore 120, a measured depth of the wellbore 120, and a horizontal displacement of the wellbore 120. There may be multiple overlapping casing strings of various sizes (e.g., length, outer diameter) contained within and between these segments or hole sections to ensure the integrity of the wellbore construction. In this case, one or more of the segments of the subterranean wellbore 120 is the substantially horizontal section 103. As stated above, in additional or alternative cases, one or more of the segments of the subterranean wellbore 120 is a substantially vertical section.

As discussed above, inserted into and disposed within the wellbore 120 of FIGS. 1A and 1B are a number of casing pipes that are coupled to each other end-to-end to form the casing string 125. In this case, each end of a casing pipe has mating threads (a type of coupling feature) disposed thereon, allowing a casing pipe to be directly or indirectly mechanically coupled to another casing pipe in an end-to-end configuration. The casing pipes of the casing string 125 may be indirectly mechanically coupled to each other using a coupling device, such as a coupling sleeve.

Each casing pipe of the casing string 125 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the shape of the casing pipe is cylindrical, the width may refer to an outer diameter, an inner diameter, or some other form of measurement of the casing pipe. Examples of a width in terms of an outer diameter may include, but are not limited to, 4½ inches, 7 inches, 7⅝ inches, 8⅝ inches, 10¾ inches, 13⅜ inches, and 14 inches.

The size (e.g., width, length) of the casing string 125 may be based on the information (e.g., diameter of the borehole drilled) gathered using field equipment with respect to the subterranean wellbore 120. The walls of the casing string 125 have an inner surface that forms a cavity that traverses the length of the casing string 125. Each casing pipe may be made of one or more of a number of suitable materials, including but not limited to steel. Cement 109 is poured into the wellbore 120 through the cavity and then forced upward between the outer surface of the casing string 125 and the wall of the subterranean wellbore 120. In some cases, a liner may additionally be used with, or alternatively be used in place of, some or all of the casing pipes.

Once the cement dries to form concrete, a number of fractures 101 are induced in the subterranean formation 110. The fractures 101 may be induced in any of a number of ways known in the industry, including but not limited to hydraulic fracturing, fracturing using electrodes, and/or other methods of inducing fractures. The hydraulic fracturing process involves the injection of large quantities of fluids (outside of the fluids discussed below with respect to FIG. 4) containing water, chemical additives, and proppants 112 into the subterranean formation 110 from the wellbore 120 to create fracture networks. An example of fracturing using electrodes may be found in U.S. Pat. No. 9,840,898 issued on Dec. 12, 2017, to Kasevich et al., the entirety of which is herein incorporated by reference. A subterranean formation 110 naturally has fractures 101, but these naturally occurring fractures 101 have inconsistent characteristics (e.g., length, spacing) and so in some cases may not be relied upon for extracting subterranean resources without having additional fractures 101, such as what is shown in FIG. 1B, induced in the subterranean formation 110.

Operations that induce fractures 101 in the subterranean formation 110 use any of a number of fluids (outside of the fluids discussed below with respect to FIG. 4) that include proppant 112 (e.g., sand, ceramic pellets). When proppant 112 is used, some of the fractures 101 (also sometimes called principal or primary fractures) receive proppant 112, while a remainder of the fractures 101 (also sometimes called secondary fractures) do not have any proppant 112 in them.

As shown in FIG. 1C, the proppant 112 is designed to become lodged inside at least some of the induced fractures 101 to keep those fractures 101 open after the fracturing operation is complete. The size of the proppant 112 is an important design consideration. Sizes (e.g., 40/70 mesh, 50/140 mesh) of the proppant 112 may vary. While the shape of the proppant 112 is shown as being uniformly spherical, and the size is substantially identical among the proppant 112, the actual sizes and shapes of the proppant 112 may vary, as shown in FIG. 8 below. If the proppant 112 is too small, the proppant 112 will not be effective at keeping the fractures 101 open enough to effectively allow subterranean resources 111 to flow through the fractures 101 from the rock matrices 162 in the subterranean formation 110 to the wellbore 120. If the proppant 112 is too large, the proppant 112 may plug up the fractures 101, blocking the flow of the subterranean resources 111 through the fractures 101.

The use of proppant 112 in certain types of subterranean formation 110, such as shale, is important. Shale formations typically have permeabilities on the order of microdarcys (µD) to nanodarcys (nD). When fractures 101 are induced in such formations with low permeabilities, it is important to sustain the fractures 101 and their conductivity for an extended period of time in order to extract more of the subterranean resource 111.

The various induced fractures 101 that originate at the wellbore 120 and extend outward into the rock matrices 162 in the subterranean formation 110 in this case have consistent penetration lengths perpendicular to the wellbore 120 and have consistent coverage along at least a portion of the lateral length (substantially horizontal section) of the wellbore 120. For example, induced fractures 101 may be 50 meters high and 200 meters long. Further, the induced fractures 101 may be spaced a distance 192 apart from each other. The distance 192 (e.g., 25 meters, 5 meters, 12 meters) may be optimized based on the permeability and the porosity of the rock matrix 162 of the subterranean formation 110.

The induced fractures 101 create a volume 190 within the subterranean formation 110 where the rock matrix 162 of the subterranean formation 110 is connected to the high conductivity fractures 101 located a short distance away. In addition to different configurations of the fractures 101, other factors that may contribute to the viability of the subterranean formation 110 may include, but are not limited to, permeability of the rock matrix 162, capillary pressure, and the temperature and pressure of the subterranean formation 110. Each fracture 101, whether induced or naturally occurring, is defined by a wall 102, also called a frac face 102 herein. The frac face 102 provides a transition between the paths formed by the rock matrices 162 in the subterranean formation 110 and the fracture 101. The subterranean resources 101 flow through the paths formed by the rock matrices 162 in the subterranean formation 110 into the fracture 101.

Figure 2:
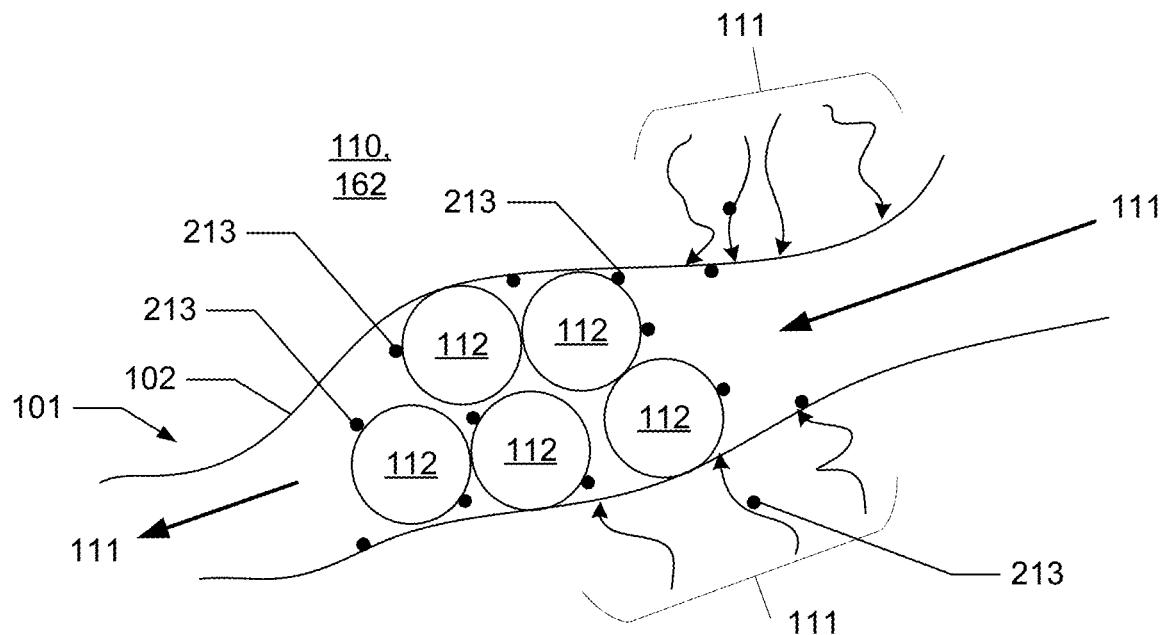
FIG. 2 shows the detail of FIG. 1C at a subsequent point in time according to certain example embodiments.
Figure 3:
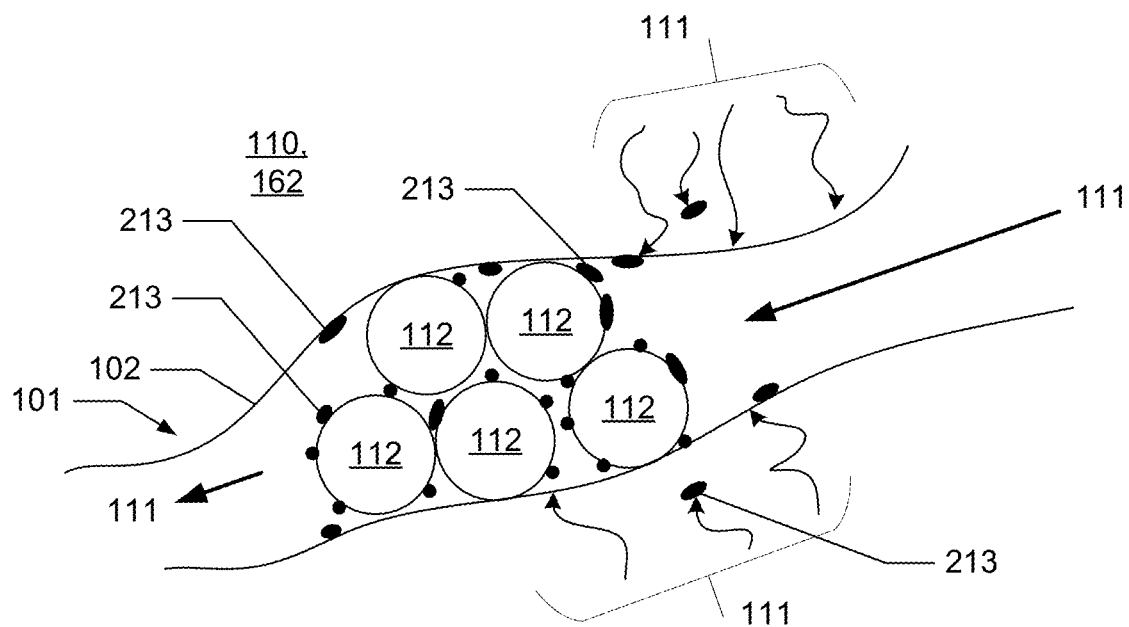
FIG. 3 shows the detail of FIG. 2 at a subsequent point in time according to certain example embodiments.

FIG. 2 shows the detail of FIG. 1C at a subsequent point in time according to certain example embodiments. FIG. 3 shows the detail of FIG. 2 at a subsequent point in time according to certain example embodiments. For example, FIG. 2 may show the detail of FIG. 1C six months later than the time captured in FIG. 1C after flowing a scale enhancer (a type of fluid) therethrough, and FIG. 3 may show the detail of FIG. 2 four year later than the time captured in FIG. 2 after continuing to flow the scale enhancer therethrough. Referring to FIGS. 1A through 3, the detail in FIG. 2 shows, in addition to the proppant 112 within the fracture 101, a subterranean resource 111 (e.g., natural gas, oil) is shown flowing within the fracture 101 from the rock matrix 162, around the proppant 112 in the fracture 101, and on to the wellbore 120.

As the subterranean resource 111 flows within the paths formed by the rock matrices 162 and around or on the proppant 112 in the fracture 101, scale deposition 213 may occur (e.g., scale particles formed during the shut-in stage before the well is put on production) on the pore throat within the rock matrices 162, on the proppant 112, and/or on the frac face 102. (It should be noted that while FIGS. 2 and 3 refer to scale deposition 213, element 213 described herein may more generally refer to any type of solid, which may also include, but is not limited to, asphaltenes, sludge, and fines.) Over time, the scale depositions 213 may begin to accumulate on the rock matrices 162, on the proppant 112, and/or on the frac face 102. In some cases, at least some of the scale depositions 213 may be an inorganic deposit from ionic materials in water that attaches to solid surfaces. Hydrocarbons may be adsorbed on scale depositions 213. Under field conditions, scale depositions 213 may be a mixture of inorganic and organic components.

Scale depositions 213 may be initiated during a prior phase (e.g., completion) of a field operation, where fluids (outside of the fluids discussed below with respect to FIG. 4) and chemicals used downhole may interact with formation rock (e.g., the frac face 102, the rock matrices 162), resulting in the mobilization and release of elements from the rock matrices 162 adjacent to the fractures 101, and comingle with formation water in and/or near perforations and along fractures 101. Later, in a subsequent phase (e.g., shutting in) of the field operation, the rock-fluid interaction and the commingling of different fluids may lead to the formation (crystallization) and growth of scale depositions 213 in or near the perforations, the rock matrices 162, and the fractures 101. In yet another subsequent phase (e.g., production) of the field operation, the degradation in the conductivity and production flow path integrity over time in the rock matrices 162 and the fractures 101, caused by agglomerate build up of scale depositions 213, may lead to plugging in or near the perforations, rock matrices 162, fractures 101, and completion tools.

The scale depositions 213 that accumulate within the rock matrices 162 and the fractures 101 may be composed of one or more of any of a number of compounds, including but not limited to calcium carbonate, barium sulfate, calcium sulfate, strontium sulfate, iron carbonate, iron oxide, iron sulfide, other oxides, other sulfides, other carbonates, other sulfates, halides, and hydroxides. While the scale depositions 213 may additionally or alternatively be composed of other compounds (e.g., gas hydrates, organic deposits (e.g., asphaltenes, waxes, acid induced sludges), and naphthenates), example embodiments may, in some cases, focus on the reduction of scale depositions 213 caused by inorganic deposits. The scale depositions 213 may be caused by one or more of any of a number of factors, including but not limited to supersaturation, mixing incompatible ions, changes in temperature, changes in pressure, carbon dioxide interaction, and a change in the pH of water in the fluid.

Scale depositions 213 may form during the shut-in stage prior to the well being put into production, as shown in FIG. 2. In such a case, the scale depositions 213 deposited on the rock matrices 162, on the proppant 112, and on the frac face 102 may be small and spotty. As a result, the scale depositions 213 do not contribute much to inhibiting the flow of the subterranean resource 111 through the paths within the rock matrices 162 and around the proppant 112 within the fracture 101 formed by the frac face 102. In the portion of the fracture 101 shown at the time captured in FIG. 2, there are 2 separate scale depositions 213 within the rock matrices 162, 8 scale depositions 213 on the proppant 112, and 4 scale depositions 213 on the frac face 102. The number, size, and location of the scale depositions 213 within the rock matrices 162 and the fracture 101 may vary.

When the well is put on production, some scale depositions 213 may stay at their original position, while some scale particles may move/migrate together with the produced water and deposit at another location along the production pathway. As more water is produced, if no mitigation efforts are made, the existing scale depositions 213 may increase in size and new scale depositions 213 may develop over time. An example of this is captured in FIG. 3, which shows that the scale depositions 213 become larger and less spotty. As a result, the scale depositions 213 in FIG. 3 begin to contribute to inhibiting the flow of the subterranean resource 111 (e.g., a hydrocarbon) along the paths formed by the rock matrices 162, through the frac face 102 (impacting migration of the subterranean resource 111 from the rock matrix 162), and around the proppant 112 (combined with the scale depositions 213 on the proppant 112 and on the frac face 102) within the fracture 101.

In the portion of the fracture 101 shown at the time captured in FIG. 3, there are 25 separate scale depositions 213 within the rock matrices 162, at the frac face 102, and on the proppant 112, many of which are significantly larger than the size of the scale depositions 213 shown in FIG. 2. Also, some of the scale depositions 213 in FIG. 3 have migrated to a new location relative to their location in FIG. 2. Again, the number, size, and location of the scale depositions 213 within the fracture 101 may vary. Example embodiments may be designed in some cases to analyze the type of inorganic material in the scale depositions 213 in a particular experiment or field condition of a field operation. Example embodiments are also designed to determine the optimal way to reduce (e.g., remediate (e.g., removal of scale depositions 213 with a chemical treatment in the form of a fluid (e.g., an acid, a chelant)), mitigate) the development and accumulation of the scale depositions 213 in that particular field operation.

Figure 4:
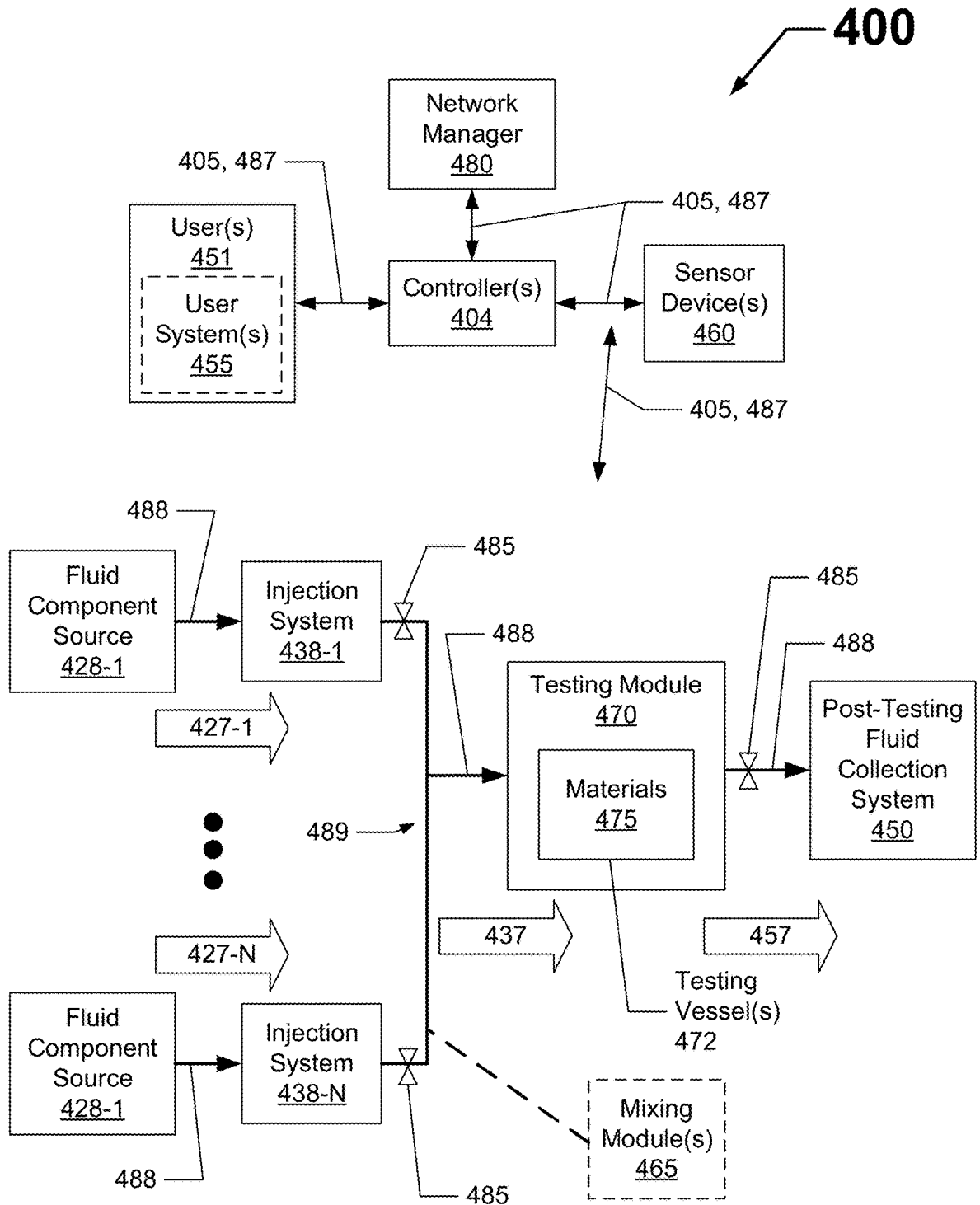
FIG. 4 shows a diagram of a testing system for assessing and reducing subsurface deposition of scales and/or other solids according to certain example embodiments.

FIG. 4 shows a diagram of a system 400 for assessing and reducing deposition of scales and/or other solids according to certain example embodiments. The system 400 of FIG. 4 includes one or more fluid component sources 428, one or more injection systems 438, a testing module 470, a post-testing fluid collection system 450, one or more optional mixing modules 465, one or more controllers 404, one or more sensor devices 460, one or more users 451 (including one or more optional user systems 455), a network manager 480, piping 488, and one or more valves 485. The testing module 470 includes one or more testing vessels 472.

The components shown in FIG. 4 are not exhaustive, and in some embodiments, one or more of the components shown in FIG. 4 may not be included in the example testing system 400. Any component of the testing system 400 may be discrete or combined with one or more other components of the testing system 400. Also, one or more components of the testing system 400 may have different configurations. For example, one or more sensor devices 460 may be disposed within or disposed on other components (e.g., the piping 488, a valve 485, the testing module 470, the post-testing fluid collection system 450). As another example, a controller 404, rather than being a stand-alone device, may be part of one or more other components (e.g., testing module 470, the post-testing fluid collection system 450, an injection system 438) of the testing system 400.

Referring to FIGS. 1A through 4, a fluid 437 is pushed through one or more testing vessels 472 of the testing module 470. As defined herein, a fluid 437 is a liquid in aqueous phase. Examples of a fluid 437 may be or include, but are not limited to, produced water (with or without chemical additives), injection water, produced fluids (e.g., oil, water), aqueous fluids prepared in a lab or received from an oilfield/well, synthesized brine, and chemical products (e.g., diluted liquid chemical products, non-diluted liquid chemical products). A fluid 437 is made up of multiple fluid components 427 (e.g., water, a dissolved salt, a chelant, a cation, an anion, a scale inhibitor additive, a brine) that are mixed together before reaching the testing module 470. Two or more fluid components 427 may be mixed together in the piping 488 at a header 489 as those fluid components 427 interact with each other to form a fluid 437 and flow toward the testing module 470. Alternatively, the testing system 400 may include one or more of the optional mixing modules 465 that mix two or more fluid components 427 together before the fluid components 427 reach the testing module 470 as a fluid 437. A mixing module 465 may include one or more of a number of features used to mix two or more fluid components 427 together. Such features may include, but are not limited to, a vessel, a sensor device 460, a controller 404, an agitator, a paddle, a circulating system, an aerator, a vibrating mechanism, and a centrifuge. A mixing module 465 and the header 489 may each be referred to as a common vessel herein.

There may be one or more fluid component sources 428. In certain example embodiments, there are at least two fluid component sources 428. As shown in FIG. 4, the system 400 includes fluid component source 428-1 (which holds fluid component 427-1) through fluid component source 428-N (which holds fluid component 427-N). Each fluid component 427 (e.g., an additive) may be or include a fluid. A single fluid component 427 or a mixture of multiple fluid components 427 (but not the fluid 437) may be disposed in a fluid component source 428. In certain example embodiments, when a fluid 437 is or includes an anionic brine, two fluid component sources 428 may be or include NaCl and NaHCO$_3$, each of which may be dissolved in de-ionized (DI) water. When the scale depositions 213 include calcite, the anion HCO$_3^-$, which originates from the NaHCO$_3$ salt, is included in the brine to provide formation of the calcite scale depositions 213. Even though this fluid 437 includes both cations and anions, it is called an anionic brine because of the HCO$_3^-$.

In addition, or in the alternative, the fluid may be or include a cationic brine (Ca$^{2+}$). In such a case, two fluid component sources 428 may be or include NaCl and CaCl$_2$), each of which may be dissolved in DI water. When the scale depositions 213 includes calcite, the cation Ca$^{2+}$, which originates from the CaCl$_2$) salt, is included in the brine to provide formation of the calcite scale depositions 213. Even though this fluid 437 includes both cations and anions, it is called a cationic brine because of the Ca$^{2+}$.

To control the composition of the fluid 437 at a given point in time, the amount of the individual fluid components 427 that are released or withdrawn from a fluid component source 428 may be regulated in real time. This regulation may be performed automatically by a controller 404 or manually by a user 451 (including an associated user system 455). This regulation may be performed using equipment such as the injection systems 438, valves 485, regulators, sensor devices 460, and meters. Examples of a fluid component source 428 may include, but are not limited to, a natural vessel (e.g., land that forms a natural body of water) and a man-made storage tank or other vessel. A fluid component 427 of a fluid component source 428 may have any of a number of different compositions that are naturally occurring or man-made. In some cases, a fluid component 427 of the fluid 437 includes water.

Each injection system 438 is configured to extract a fluid component 427 from a fluid component source 428 and push the fluid component 427 toward the testing module 470. The number of injection systems 438 in the testing system 400 may vary. In this case, there are N injection systems 438 (injection 438-1 through 438-N). In some embodiments, there may be one injection system 438 for each fluid component source 428. In alternative embodiments, there may be one injection system 438 for multiple fluid component sources 428. Each injection system 438 may include one or more of a number of pieces of equipment to perform its function. Examples of such equipment may include, but are not limited to, a compressor, a motor, a pump, piping (e.g., piping 488), a valve (e.g., valve 485), a controller (e.g., controller 404), and a sensor device (e.g., sensor device 460).

The piping 488 (including the header 489) may include multiple pipes, ducts, elbows, joints, sleeves, collars, and similar components that are coupled to each other (e.g., using coupling features such as mating threads) to establish a network for transporting the fluid components 427 from the fluid component sources 428, through the injection systems 438, to the header 489 (where the fluid components 427 mix together to form a fluid 437), to the testing module 470, and finally from the testing module 470 to the post-testing fluid collection system 450. Each component of the piping 488 may have an appropriate size (e.g., inner diameter, outer diameter) and be made of an appropriate material (e.g., steel, PVC) to safely and efficiently handle the pressure, temperature, flow rate, and other characteristics of the fluid components 427 or each fluid 437, as applicable.

There may be a number of valves 485 placed in-line with the piping 488 at various locations (including at the header 489) in the testing system 400 to control the flow of fluid components 427 and/or each fluid 437 therethrough. A valve 485 may have one or more of any of a number of configurations, including but not limited to a guillotine valve, a ball valve, a gate valve, a butterfly valve, a pinch valve, a needle valve, a plug valve, a diaphragm valve, and a globe valve. One valve 485 may be configured the same as or differently compared to another valve 485 in the testing system 400. Also, one valve 485 may be controlled (e.g., manually, automatically by the controller 404) the same as or differently compared to another valve 485 in the testing system 400.

The testing module 470 is configured to house one or more testing vessels 472. The testing module 470 receives a fluid 437 from the header 489, allows the fluid 437 to run through one or more testing vessels 472, and sends the post-testing fluid 457 to the post-testing fluid collection system 450. When multiple testing vessels 472 are involved in a particular test with a fluid 437, one testing vessel 472 may be configured in series and/or in parallel with respect to one or more of the other testing vessels 472.

In certain example embodiments, the testing vessels 472 are passive objects that have a fluid 437 pass through them without the testing vessels 472 being modified or taking action during this process. In such a case, the testing module 470 may control various aspects (e.g., temperature, pressure, flow rate) of the fluid 437 and/or the testing vessel 472. In certain example embodiments, the testing module 470 is designed to subject the materials 475 in the testing vessel 472 to conditions (e.g., pressure, temperature, flow rate) that are representative of the corresponding conditions of the fractures 101 and rock matrices 162 in the subterranean formation 110 adjacent to the wellbore 120. The testing module 470 may include one or more of a number of pieces of equipment to perform these functions. Examples of such equipment may include, but are not limited to, a motor, a pump, a compressor, piping (e.g., piping 488), a valve (e.g., valve 485), a controller (e.g., controller 404), and a sensor device (e.g., sensor device 460).

A testing vessel 472 is a vessel (e.g., a column) inside of which various materials 475 (e.g., rock, proppant 112, scale depositions 213, solid scale inhibitors) are disposed. The materials 475 in a testing vessel 472 may be designed to be representative of induced fractures 101 in a subterranean formation 110 adjacent to a wellbore 120. In some cases, the materials 475 placed in a testing vessel 472 are taken from the subterranean formation 110. For example, cuttings or other loose rock that circulate to the surface 108 during a field operation (e.g., drilling, completion) may be removed from the mud circulating system (part of the field equipment 109) and placed in a testing vessel 472.

As another example, a core sample may be taken of the subterranean formation 110 by a tool (e.g., a wireline tool) placed in the wellbore 120 adjacent to the induced fractures 101. In such a case, the core sample may be retrieved from the tool when the tool is brought to the surface 108 and subsequently placed, either intact or crushed (cutting size), in a testing vessel 472. As still another example, proppant 112 used to prop open the induced fractures 101 adjacent to the wellbore 120 may be used as some of the materials 475 in the testing vessel 472. Factors that may be controlled with respect to the materials 475 in a testing vessel 472 may include, but are not limited to, the number of materials 475, the content (e.g., rock (e.g., cuttings, core samples), materials (e.g., metal) of field equipment, proppant, scale inhibitor, oil-phase solids, oil-phase sludges, water-phase solids, water-phase sludges) of the materials 475, the size of the materials 475, and the shape of the materials 475.

The main purpose of the testing module 470 is to be representative of downhole conditions by continually providing a fluid 437 that flows through the material 475 in the testing vessel 472. In order to accomplish this, the testing vessel 472 may be made of any of a number of appropriate materials (e.g., glass, polytetrafluoroethylene-lined stainless steel) that may withstand the conditions (e.g., pressure, temperature, salinity, flow rate) experienced by the testing module 470, which are designed to be representative of downhole conditions. After a period of time, the testing process may be paused or stopped so that the materials 475 in the testing vessel 472 may be evaluated. In some example embodiments, the fluid 437 may be designed to reduce (e.g., eliminate, lower) scaling that may appear and grow on some of the materials 475 (e.g., the proppant 112, rock, materials (e.g., metals) representative of downhole equipment (e.g., casing pipe) and/or other (e.g., surface) equipment (e.g., wellhead, pumping equipment) used in a field operation) in the testing vessel 472. Evaluation of the materials 475 in the testing vessel 472 may include characterizing (e.g., determining the amount of) scale depositions 213 disposed on the proppant 112, rock, and/or other materials 475 in a testing vessel 472 over time. This characterization and evaluation may then be correlated to how effective a fluid 437 that includes a scale inhibitor or other fluids/chemicals used during that phase of testing may be at reducing (e.g., eliminating, lowering) scale depositions 213 in the induced fractures 101 adjacent to the wellbore 120.

As another example, if a desired goal is to use the testing module 470 to determine the impact of freshly formed scale depositions 213 on fracture conductivity, the testing module 470 may be used to gauge the optimal fluid 437 (e.g., the concentration of a particular brine) so that the formation of scale depositions 213 occurs on some or all of the materials 475 in the testing vessel 472. For instance, an initial test may be performed to determine the amount of time (sometimes called induction time) it takes for calcite (a form of scale deposition 213) to start to form. By mixing a fluid of cationic ($Ca^{2+}$) and anionic ($HCO_3^{2-}$) brines (individually, these brines are considered fluid components 427 of the fluid 437), it may be found that scale depositions 213 develop after 40 seconds in a test tube or bottle (a form of testing vessel 472). As yet another example, if a desired goal is to use the testing module 470 to determine if a non-scaling fluid 437 (e.g., a type of brine) may pass through the materials 475 in the testing vessel 472 without disturbing the proppant 112, the testing module 470 may be used to demonstrate blockage within the materials 475 in the testing vessel 472 using a fluid 437 that promotes scaling.

As still another example, if a desired goal is to use the testing module 470 to demonstrate that a particular fluid 437 (also sometimes called a chemical treatment herein) may decrease formation of scale depositions 213 and other blockage in the materials 475 (or components thereof, such as proppant 112 and rock) within the testing vessel 472, the testing module 470 may be used to analyze the effectiveness of various fluids 437 as scale inhibitors. In some cases, the testing module 470 may include one or more features (e.g., a spectrograph, a gas chromatograph, a camera with a high zoom lens, a controller 404, one or more sensor devices 460) that perform some or all of the evaluation of materials 475 within a testing vessel 472 that have been tested. The testing vessel 472 may be removable (e.g., by a user 451) from and insertable into the testing module 470. The testing module 470 may include one or more features (e.g., a clamp, a latched lid) that ensure that a testing vessel 472 is secure within the testing module 470.

Objectives that may be achieved by having a fluid 437 flow through materials 475 in a testing vessel 472 of the testing module 470 may include, but are not limited to, determining whether scale depositions 213 may deposit at subsurface fractures, determining how scale deposition 213 on the materials 475 impacts permeability and fluid flow, determining how scale deposition 213 on the materials 475 impacts the frac face 102 and surface of proppant 112, determining how much scale deposition 213 may cause significant change in permeability, determining how adding scale inhibitor in a fluid 437 (e.g., a scaling brine) may mitigate scale depositions 213 on the materials 475, determining the impact of crushing/embedding/clustering of proppant 112 on solid depositions (e.g., scale depositions 213) and flow assurance risks (e.g., plugging, fluid flow restriction), determining the effectiveness and impact of chemical additives (e.g., chelants, acids) as fluid components 427 of a fluid 437 on the removal of scale depositions 213 at fractures 101 (e.g., in rock matrices 162, on proppant 112, on a frac face 102), determining the effectiveness of pre-packed solid scale inhibitors as fluid components 427 of a fluid 437 in mitigating scale deposition 213 from produced water, studying adsorption and desorption of scale depositions 213 from a frac face 102 in fractures 101, optimizing squeeze treatment design to control scale depositions 213, and determining the impact of water cut (representative of field condition produced fluid contains both oil and water) on scale depositions 213 on a frac face 102, rock matrices 162, and proppants 112.

One or more sensor devices 460 may be integrated with the testing module 470. For example, two sensor devices 460 in the form of or including pressure sensors may be positioned before the testing vessel 472 and after the testing vessel 472 to provide a differential pressure value across the testing vessel 472. The differential pressure value may provide information as to, for example, a change in permeability, an accumulation of scale depositions 213, and/or other plugging in the material 475. In addition, or in the alternative, one or more sensor devices 460 (e.g., a permeability meter) may be integrated with the testing vessel 472 to measure the permeability of the materials 475. In some cases, in order to ensure that the post-testing fluid collection system 450 receives the post-testing fluid 457 from the testing module 470 at an appropriate pressure, a pressure regulator (or other similar equipment) may be installed between the testing vessel 472 and the post-testing fluid collection system 450.

The post-testing fluid collection system 450 is configured to receive the post-testing fluid 457, which is the byproduct of the fluid 437 that has flowed through the materials 475 in one or more testing vessels 472 of the testing module 470. The post-testing fluid collection system 450 may include a vessel to contain some or all of the post-testing fluid 457. In some cases, the post-testing fluid collection system 450 may also be configured to perform one or more tests on the post-testing fluid 457. In such cases, the post-testing fluid collection system 450 may include one or more of a number of features (e.g., a motor, a pump, a compressor, piping (e.g., piping 488), a valve (e.g., valve 485), a spectrograph, a gas chromatograph, a camera with a high zoom lens, a controller 404, one or more sensor devices 460) to conduct such testing.

The testing system 400 may include one or more controllers 404. A controller 404 of the testing system 400 communicates with and in some cases controls one or more of the other components (e.g., a sensor device 460, an injection system 438, the testing module 470, the post-testing fluid collection system 450) of the testing system 400. A controller 404 performs a number of functions that include obtaining and sending data, evaluating data, following protocols, running algorithms, and sending commands. A controller 404 may include one or more of a number of components. As discussed below with respect to FIG. 5, such components of a controller 404 may include, but are not limited to, a control engine, a communication module, a timer, a counter, a power module, a storage repository, a hardware processor, memory, a transceiver, an application interface, and a security module. When there are multiple controllers 404 (e.g., one controller 404 for one or more injection systems 438, another controller 404 for the testing module 470, yet another controller 404 for the post-testing fluid collection system 450), each controller 404 may operate independently of each other. Alternatively, one or more of the controllers 404 may work cooperatively with each other. As yet another alternative, one of the controllers 404 may control some or all of one or more other controllers 404 in the testing system 400. Each controller 404 may be considered a type of computer device, as discussed below with respect to FIG. 6.

Each sensor device 460 includes one or more sensors that measure one or more parameters (e.g., pressure, flow rate, temperature, humidity, fluid content, voltage, current, permeability, porosity, rock characteristics). Examples of a sensor of a sensor device 460 may include, but are not limited to, a temperature sensor, a flow sensor, a pressure sensor, a gas spectrometer, a voltmeter, an ammeter, a permeability meter, a porosimeter, and a camera. A sensor device 460 may be integrated with or measure a parameter associated with one or more components of the testing system 400. For example, a sensor device 460 may be configured to measure a parameter (e.g., flow rate, pressure, temperature) of a fluid component 427 or a fluid 437 flowing through the piping 488 at a particular location (e.g., between a fluid component source 428 and a corresponding injection system 438, between the header 489 and the testing module 470, between the testing module 470 and the post-testing fluid collection system 450).

As another example, a sensor device 460 may be configured to determine how open or closed a valve 485 within the testing system 400 is. As yet another example, one or more sensor devices 460 may be used to characterize (e.g., identify an amount of) scale depositions 213 that have accumulated on proppant 112 in a testing vessel 472. In some cases, a number of sensor devices 460, each measuring a different parameter, may be used in combination to determine and confirm whether a controller 404 should take a particular action (e.g., operate a valve 485, operate or adjust the operation of the testing module 470). When a sensor device 460 includes its own controller 404 (or portions thereof), then the sensor device 460 may be considered a type of computer device, as discussed below with respect to FIG. 6.

A user 451 may be any person that interacts, directly or indirectly, with a controller 404 and/or any other component of the testing system 400. Examples of a user 451 may include, but are not limited to, a business owner, a research scientist, an engineer, a company representative, a geologist, a consultant, a drilling engineer, a contractor, and a manufacturer's representative. A user 451 may use one or more user systems 455, which may include a display (e.g., a GUI). A user system 455 of a user 451 may interact with (e.g., send data to, obtain data from) the controller 404 via an application interface and using the communication links 405. The user 451 may also interact directly with the controller 404 through a user interface (e.g., keyboard, mouse, touchscreen).

The network manager 480 is a device or component that controls all or a portion (e.g., a communication network, the controller 404) of the testing system 400. The network manager 480 may be substantially similar to the controller 404, as described above. For example, the network manager 480 may include a controller that has one or more components and/or similar functionality to some or all of the controller 404. Alternatively, the network manager 480 may include one or more of a number of features in addition to, or altered from, the features of the controller 404. As described herein, control and/or communication with the network manager 480 may include communicating with one or more other components of the same testing system 400 or another system. In such a case, the network manager 480 may facilitate such control and/or communication. The network manager 480 may be called by other names, including but not limited to a master controller, a network controller, and an enterprise manager. The network manager 480 may be considered a type of computer device, as discussed below with respect to FIG. 6.

Interaction between each controller 404, the sensor devices 460, the users 451 (including any associated user systems 455), the network manager 480, and other components (e.g., the valves 485, an injection system 438, the testing module 470, and the post-testing fluid collection system 450) of the testing system 400 may be conducted using communication links 405 and/or power transfer links 487. Each communication link 405 may include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, Bluetooth Low Energy (BLE), ultra-wide band (UWB), WirelessHART, ISA100) technology. A communication link 405 may transmit signals (e.g., communication signals, control signals, data) between each controller 404, the sensor devices 460, the users 451 (including any associated user systems 455), the network manager 480, and the other components of the testing system 400.

Each power transfer link 487 may include one or more electrical conductors, which may be individual or part of one or more electrical cables. In some cases, as with inductive power, power may be transferred wirelessly using power transfer links 487. A power transfer link 487 may transmit power between each controller 404, the sensor devices 460, the users 451 (including any associated user systems 455), the network manager 480, and the other components of the testing system 400. Each power transfer link 487 may be sized (e.g., 12 gauge, 18 gauge, 4 gauge) in a manner suitable for the amount (e.g., 480V, 24V, 120V) and type (e.g., alternating current, direct current) of power transferred therethrough.

Figure 5:
FIG. 5 shows a system diagram of a controller according to certain example embodiments.
Figure 5:
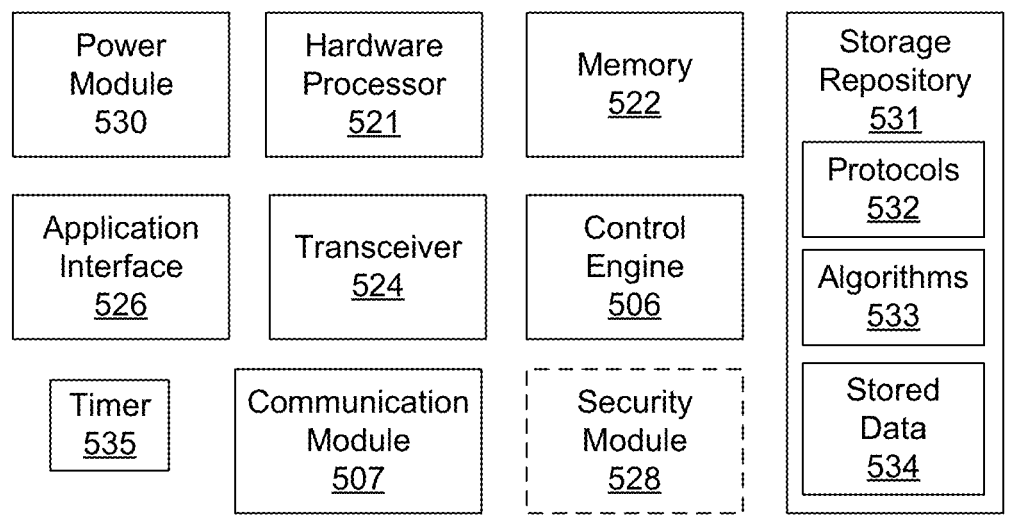

FIG. 5 shows a system diagram of a controller 404 according to certain example embodiments. Referring to FIGS. 1A through 5, the controller 404 may be substantially the same as a controller 404 discussed above with respect to FIG. 4. The controller 404 includes multiple components. In this case, the controller 404 of FIG. 5 includes a control engine 506, a communication module 507, a timer 535, a power module 530, a storage repository 531, a hardware processor 521, a memory 522, a transceiver 524, an application interface 526, and, optionally, a security module 528. The controller 404 (or components thereof) may be located at or near the various components of the testing system 400. In addition, or in the alternative, the controller 404 (or components thereof) may be located remotely from (e.g., in the cloud, at an office building) the various components of the testing system 400.

The storage repository 531 may be a persistent storage device (or set of devices) that stores software and data used to assist the controller 404 in communicating with one or more other components of a system, such as the users 451 (including associated user systems 455), each injection system 438, the testing module 470, each post-testing fluid collection system 450, the network manager 480, and the sensor devices 460 of the testing system 400 of FIG. 4 above. In one or more example embodiments, the storage repository 531 stores one or more protocols 532, algorithms 533, and stored data 534.

The protocols 532 of the storage repository 531 may be any procedures (e.g., a series of method steps) and/or other similar operational processes that the control engine 506 of the controller 404 follows based on certain conditions at a point in time. The protocols 532 may include any of a number of communication protocols that are used to send and/or obtain data between the controller 404 and other components of a system (e.g., testing system 400). Such protocols 532 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 532 may provide a layer of security to the data transferred within a system (e.g., testing system 400). Other protocols 532 used for communication may be associated with the use of Wi-Fi, Zigbee, visible light communication (VLC), cellular networking, BLE, UWB, and Bluetooth.

The algorithms 533 may be any formulas, mathematical models, forecasts, simulations, and/or other similar tools that the control engine 506 of the controller 404 uses to reach a computational conclusion. For example, one or more algorithms 533 may be used, in conjunction with one or more protocols 532, to assist the controller 404 to determine when to start, adjust, and/or stop the operation of the testing module 470 and/or the post-testing fluid collection system 450. As another example, one or more algorithms 533 may be used, in conjunction with one or more protocols 532, to assist the controller 404 to determine when to start, adjust, and/or stop the operation of an injection system 438. As yet another example, one or more algorithms 533 may be used, in conjunction with one or more protocols 532, to assist the controller 404 to identify an optimal formulation of a fluid to reduce or eliminate scale depositions 213 on proppant 112 within a testing vessel 472. As still another example, one or more algorithms 533 may be used, in conjunction with one or more protocols 532, to assist the controller 404 in trending the performance of a fluid under certain conditions over time.

An example of an algorithm 533 is represented by the formula: $Q=[kA(P_i-P_o)]\div\mu L$, where Q is a flow rate (in cm$^3$/s), $P_i$ is inlet fluid pressure (in Pa), $P_o$ is outlet fluid pressure (in Pa), μ is dynamic viscosity of the fluid (poise or Pa·S), L is the length of the material in the testing vessel 472 (in cm), k is the permeability of the materials 475 in the testing vessel 472 (in mD), and A is the area of the materials 475 in the testing vessel 472 (in cm$^2$).

Stored data 534 may be any data associated with a field (e.g., the subterranean formation 110, the induced fractures 101, the rock matrices 162 within the volume 190 adjacent to a wellbore 120, the characteristics of proppant 112 used in a field operation), other fields (e.g., other wellbores and subterranean formations), the other components (e.g., the user systems 455, the testing module 270, the materials 475 in the testing vessel 472, the post-testing fluid collection system 450), including associated equipment (e.g., motors, pumps, compressors), of the testing system 400, measurements made by the sensor devices 460, threshold values, tables, results of previously run or calculated algorithms 533, updates to protocols 532, user preferences, and/or any other suitable data. Such data may be any type of data, including but not limited to historical data, present data, and future data (e.g., forecasts). The stored data 534 may be associated with some measurement of time derived, for example, from the timer 535.

Examples of a storage repository 531 may include, but are not limited to, a database (or a number of databases), a file system, cloud-based storage, a hard drive, flash memory, some other form of solid-state data storage, or any suitable combination thereof. The storage repository 531 may be located on multiple physical machines, each storing all or a portion of the communication protocols 532, the algorithms 533, and/or the stored data 534 according to some example embodiments. Each storage unit or device may be physically located in the same or in a different geographic location.

The storage repository 531 may be operatively connected to the control engine 506. In one or more example embodiments, the control engine 506 includes functionality to communicate with the users 451 (including associated user systems 455), the sensor devices 460, the network manager 480, and the other components in the testing system 400. More specifically, the control engine 506 sends information to and/or obtains information from the storage repository 531 in order to communicate with the users 451 (including associated user systems 455), the sensor devices 460, the network manager 480, and the other components of the testing system 400. As discussed below, the storage repository 531 may also be operatively connected to the communication module 507 in certain example embodiments.

In certain example embodiments, the control engine 506 of the controller 404 controls the operation of one or more components (e.g., the communication module 507, the timer 535, the transceiver 524) of the controller 404. For example, the control engine 506 may activate the communication module 507 when the communication module 507 is in "sleep" mode and when the communication module 507 is needed to send data obtained from another component (e.g., a sensor device 460) in the testing system 400. In addition, the control engine 506 of the controller 404 may control the operation of one or more other components (e.g., the testing module 470, the post-testing fluid collection system 450, an injection system 438), or portions thereof, of the testing system 400.

The control engine 506 of the controller 404 may communicate with one or more other components of the testing system 400. For example, the control engine 506 may use one or more protocols 532 to facilitate communication with the sensor devices 460 to obtain data (e.g., measurements of various parameters, such as temperature, pressure, and flow rate), whether in real time or on a periodic basis and/or to instruct a sensor device 460 to take a measurement. The control engine 506 may use measurements of parameters taken by sensor devices 460 while a fluid flows through the materials 475 in a testing vessel 472, as well as one or more protocols 532 and/or algorithms 533, to analyze the performance of the fluid 437 (e.g., that includes a scale inhibitor with a concentration ranging from lower (e.g., 1 ppmv) concentrations to higher (e.g., 50 ppmv, up to 20%) concentrations) in reducing scale depositions 213 on proppant 112, rock, and/or other components of the materials 475 in the testing vessel 472.

As yet another example, the control engine 506 may use one or more algorithms 533 and/or protocols 532 to recommend a change to the formulation (e.g., adding a fluid component 427, removing a fluid component 427, increasing an amount of a fluid component 427, decreasing an amount of a fluid component 427) of a fluid 437 in an attempt to improve reduction of scale depositions 213 on some or all of the materials 475. For instance, a fluid 437 may include a scale inhibitor to prevent/inhibit the formation of new scale depositions 213 from an aqueous phase. As another example, a fluid 437 may include chelants, an acid treatment product, or a scale removal product to remove existing scale depositions 213. The system 400 may be used for either or both purposes. As a specific example, the materials 475 may include proppant 112. An initial fluid 437 that flows through the materials 475 in the testing vessel 472 of the testing module 470 may cause scale depositions 213 to form on the proppant 112. Later, a different fluid 437 that includes a non-scaling brine (e.g., a cation brine only) may flow through the materials 475 in the testing vessel 472 of the testing module 470 to understand how the permeability of some or all of the materials 475 evolves over time.

The control engine 506 may generate and process data associated with control, communication, and/or other signals sent to and obtained from the users 451 (including associated user systems 455), the sensor devices 460, the network manager 480, and the other components of the testing system 400. In certain embodiments, the control engine 506 of the controller 404 may communicate with one or more components of a system external to the testing system 400. For example, the control engine 506 may interact with an inventory management system by ordering replacements for components or pieces of equipment (e.g., a sensor device 460, a valve 485, a motor) within the testing system 400 that has failed or is failing. As another example, the control engine 506 may interact with a contractor or workforce scheduling system by arranging for the labor needed to replace a component or piece of equipment in the testing system 400. In this way and in other ways, the controller 404 is capable of performing a number of functions beyond what could reasonably be considered a routine task.

In certain example embodiments, the control engine 506 may include an interface that enables the control engine 506 to communicate with the sensor devices 460, the user systems 455, the network manager 480, and the other components of the testing system 400. For example, if a user system 455 operates under IEC Standard 62386, then the user system 455 may have a serial communication interface that will transfer data to the controller 404. Such an interface may operate in conjunction with, or independently of, the protocols 532 used to communicate between the controller 404 and the users 451 (including corresponding user systems 455), the sensor devices 460, the network manager 480, and the other components of the testing system 400.

The control engine 506 (or other components of the controller 404) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 507 of the controller 404 determines and implements the communication protocol (e.g., from the protocols 532 of the storage repository 531) that is used when the control engine 506 communicates with (e.g., sends signals to, obtains signals from) the user systems 455, the sensor devices 460, the network manager 480, and the other components of the testing system 400. In some cases, the communication module 507 accesses the stored data 534 to determine which communication protocol is used to communicate with another component of the testing system 400. In addition, the communication module 507 may identify and/or interpret the communication protocol of a communication obtained by the controller 404 so that the control engine 506 may interpret the communication. The communication module 507 may also provide one or more of a number of other services with respect to data sent from and obtained by the controller 404. Such services may include, but are not limited to, data packet routing information and procedures to follow in the event of data interruption.

The timer 535 of the controller 404 may track clock time, intervals of time, an amount of time, and/or any other measure of time. The timer 535 may also count the number of occurrences of an event, whether with or without respect to time. Alternatively, the control engine 506 may perform a counting function. The timer 535 is able to track multiple time measurements and/or count multiple occurrences concurrently. The timer 535 may track time periods based on an instruction obtained from the control engine 506, based on an instruction obtained from a user 451, based on an instruction programmed in the software for the controller 404, based on some other condition (e.g., the occurrence of an event) or from some other component, or from any combination thereof. In certain example embodiments, the timer 535 may provide a time stamp for each packet of data obtained from another component (e.g., a sensor device 460) of the testing system 400.

The power module 530 of the controller 404 obtains power from a power supply (e.g., AC mains) and manipulates (e.g., transforms, rectifies, inverts) that power to provide the manipulated power to one or more other components (e.g., the timer 535, the control engine 506) of the controller 404, where the manipulated power is of a type (e.g., alternating current, direct current) and level (e.g., 12V, 24V, 120V) that may be used by the other components of the controller 404. In some cases, the power module 530 may also provide power to one or more of the sensor devices 460.

The power module 530 may include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 may be a source of power in itself to provide signals to the other components of the controller 404. For example, the power module 530 may be or include an energy storage device (e.g., a battery). As another example, the power module 530 may be or include a localized photovoltaic power system.

The hardware processor 521 of the controller 404 executes software, algorithms (e.g., algorithms 533), and firmware in accordance with one or more example embodiments. Specifically, the hardware processor 521 may execute software on the control engine 506 or any other portion of the controller 404, as well as software used by the users 451 (including associated user systems 455), the network manager 480, and/or other components of the testing system 400.

The hardware processor 521 may be an integrated circuit, a central processing unit, a multi-core processing chip, SoC, a multi-chip module including multiple multi-core processing chips, or other hardware processor in one or more example embodiments. The hardware processor 521 may be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 may include volatile and/or non-volatile memory. The memory 522 may be discretely located within the controller 404 relative to the hardware processor 521. In certain configurations, the memory 522 may be integrated with the hardware processor 521.

In certain example embodiments, the controller 404 does not include a hardware processor 521. In such a case, the controller 404 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices may be used in conjunction with one or more hardware processors 521.

The transceiver 524 of the controller 404 may send and/or obtain control and/or communication signals. Specifically, the transceiver 524 may be used to transfer data between the controller 404 and the users 451 (including associated user systems 455), the sensor devices 460, the network manager 480, and the other components of the testing system 400. The transceiver 524 may use wired and/or wireless technology. The transceiver 524 may be configured in such a way that the control and/or communication signals sent and/or obtained by the transceiver 524 may be obtained and/or sent by another transceiver that is part of a user system 455, a sensor device 460, the network manager 480, and/or another component of the testing system 400. The transceiver 524 may send and/or obtain any of a number of signal types, including but not limited to radio frequency signals.

When the transceiver 524 uses wireless technology, any type of wireless technology may be used by the transceiver 524 in sending and obtaining signals. Such wireless technology may include, but is not limited to, Wi-Fi, Zigbee, VLC, cellular networking, BLE, UWB, and Bluetooth. The transceiver 524 may use one or more of any number of suitable communication protocols (e.g., ISA100, HART) when sending and/or obtaining signals.

Optionally, in one or more example embodiments, the security module 528 secures interactions between the controller 404, the users 451 (including associated user systems 455), the sensor devices 460, the network manager 480, and the other components of the testing system 400. More specifically, the security module 528 authenticates communication from software based on security keys verifying the identity of the source of the communication. For example, user software may be associated with a security key enabling the software of a user system 455 to interact with the controller 404. Further, the security module 528 may restrict receipt of information, requests for information, and/or access to information.

A user 451 (including an associated user system 455), the sensor devices 460, the network manager 480, and the other components of the testing system 400 may interact with the controller 404 using the application interface 526. Specifically, the application interface 526 of the controller 404 obtains data (e.g., information, communications, instructions, updates to firmware) from and sends data (e.g., information, communications, instructions) to the user systems 455 of the users 451, the sensor devices 460, the network manager 480, and/or the other components of the testing system 400. Examples of an application interface 526 may be or include, but are not limited to, an application programming interface, a web service, a data protocol adapter, some other hardware and/or software, or any suitable combination thereof. Similarly, the user systems 455 of the users 451, the sensor devices 460, the network manager 480, and/or the other components of the testing system 400 may include an interface (similar to the application interface 526 of the controller 404) to obtain data from and send data to the controller 404 in certain example embodiments.

In addition, as discussed above with respect to a user system 455 of a user 451, one or more of the sensor devices 460, the network manager 480, and/or one or more of the other components of the testing system 400 may include a user interface. Examples of such a user interface may include, but are not limited to, a graphical user interface, a touchscreen, a keyboard, a monitor, a mouse, some other hardware, or any suitable combination thereof.

The controller 404, the users 451 (including associated user systems 455), the sensor devices 460, the network manager 480, and the other components of the testing system 400 may use their own system or share a system in certain example embodiments. Such a system may be, or contain a form of, an Internet-based or an intranet-based computer system that is capable of communicating with various software. A computer system includes any type of computing device and/or communication device, including but not limited to the controller 404. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 6.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the testing system 400.

Figure 6:
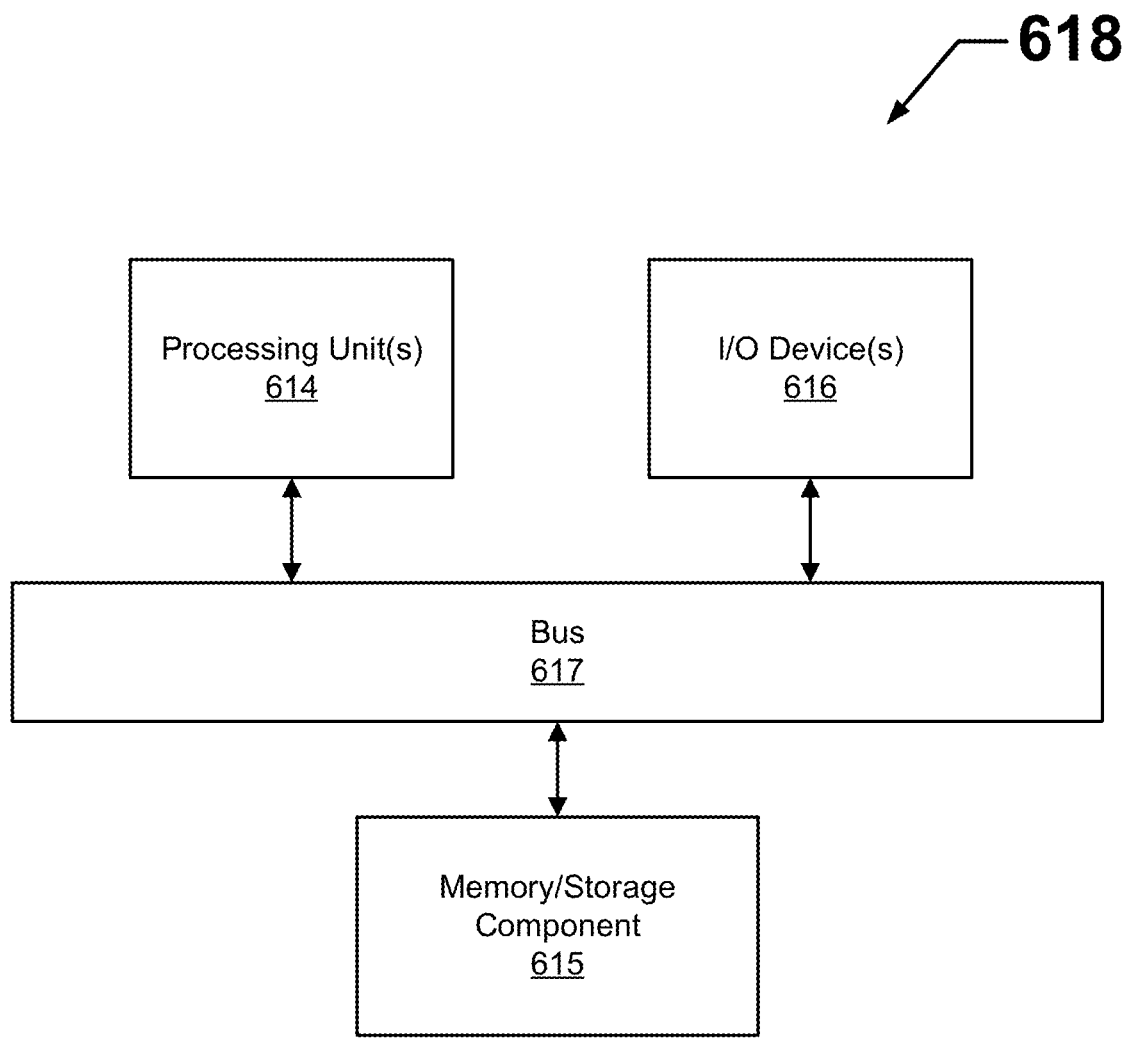
FIG. 6 shows a computing device in accordance with certain example embodiments.

FIG. 6 illustrates one embodiment of a computing device 618 that implements one or more of the various techniques described herein, and which is representative, in whole or in part, of the elements described herein pursuant to certain example embodiments. For example, a controller 404 (including components thereof, such as a control engine 506, a hardware processor 520, a storage repository 531, a power module 530, and a transceiver 524) may be considered a computing device 618. Computing device 618 is one example of a computing device and is not intended to suggest any limitation as to scope of use or functionality of the computing device and/or its possible architectures. Neither should the computing device 618 be interpreted as having any dependency or requirement relating to any one or combination of components illustrated in the example computing device 618.

The computing device 618 includes one or more processors or processing units 614, one or more memory/storage components 615, one or more input/output (I/O) devices 616, and a bus 617 that allows the various components and devices to communicate with one another. The bus 617 represents one or more of any of several types of bus structures, including a memory bus or memory controller, a peripheral bus, an accelerated graphics port, and a processor or local bus using any of a variety of bus architectures. The bus 617 includes wired and/or wireless buses.

The memory/storage component 615 represents one or more computer storage media. The memory/storage component 615 includes volatile media (such as random access memory (RAM)) and/or nonvolatile media (such as read only memory (ROM), flash memory, optical disks, magnetic disks, and so forth). The memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a user 451 to enter commands and information to the computing device 618, and also allow information to be presented to the user 160 and/or other components or devices. Examples of input devices 616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments. Further, one or more embodiments is implemented on a distributed system having one or more nodes, where each portion of the implementation (e.g., an injection system 438, the testing module 470, the post-testing fluid collection system 450) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 7:
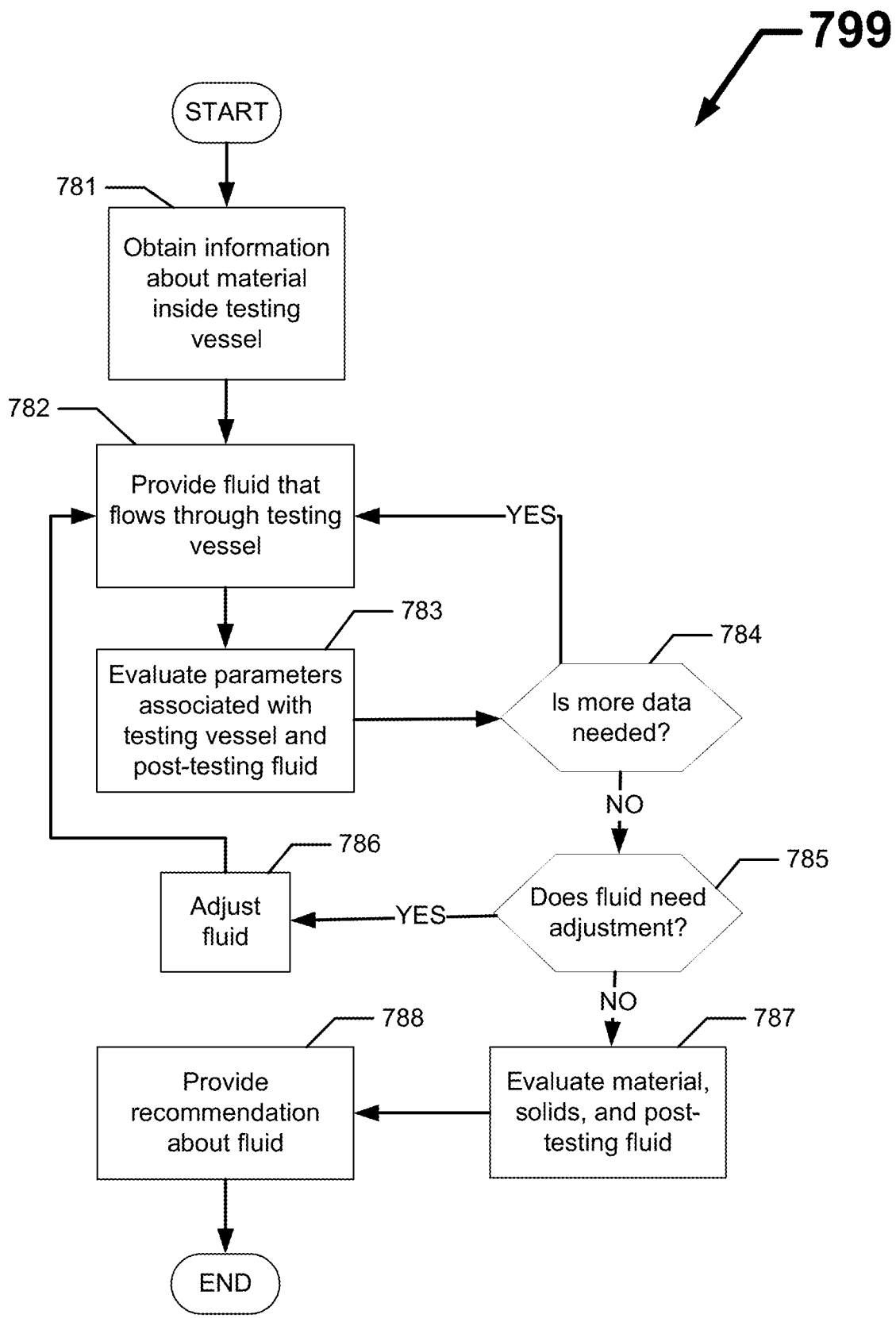
FIG. 7 shows a flowchart of a method for evaluating a fluid for reducing scale deposition within fractures according to certain example embodiments.

FIG. 7 shows a flowchart 799 of a method for evaluating a fluid for reducing scale deposition within a fractured subterranean formation according to certain example embodiments. While the various steps in this flowchart 799 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 7 may be included in performing this method. Accordingly, the specific arrangement of steps should not be construed as limiting the scope. Further, a particular computing device, such as the computing device discussed above with respect to FIG. 6, may be used to perform one or more of the steps for the methods shown in FIG. 7 in certain example embodiments. Any of the functions performed below by a controller 404 may involve the use of one or more protocols 532, one or more algorithms 533, and/or stored data 534 stored in a storage repository 531.

The method shown in FIG. 7 is merely an example that may be performed by using an example system described herein. In other words, systems for evaluating a fluid for reducing scale deposition within a fractured subterranean formation may perform other functions using other methods in addition to and/or aside from those shown in FIG. 7. Referring to FIGS. 1A through 7, the method shown in the flowchart 799 of FIG. 7 begins at the START step and proceeds to step 781, where information about the materials 475 inside a testing vessel 472 is obtained. As used herein, the term "obtaining" may include receiving, retrieving, accessing, generating, etc. or any other manner of obtaining the information. The testing vessel 472 may be part of a testing module 470.

The information may be obtained by a controller 404 (or an obtaining component thereof), which may include the controller 404 of FIG. 5 above, using one or more algorithms 533 and/or one or more protocols 532. The information may be obtained from a user 451, including an associated user system 455. In addition, or in the alternative, the information may be obtained from one or more sensor devices 460 that measure various parameters. Examples of the information obtained may include, but are not limited to, a composition (e.g., proppant 112, rock) of the materials 475, size of proppant 112, rock type, size of the rock, permeability, porosity, and the arrangement of the materials 475 within the testing vessel 472 with respect to the flow of the fluid 437 (to be representative of field conditions). In certain example embodiments, the materials 475 include rock and proppant. The materials 475 may be designed to be representative of the fractured subterranean formation 110 adjacent to the wellbore 120. In some cases, solid scale inhibitors may additionally or alternatively be among the materials 475.

The information may also be associated with the testing vessel 472 that contains the materials 475. Information associated with the testing vessel 472 may include, but is not limited to, the dimensions (e.g., length, width, height, cross-sectional shape) of the testing vessel 472 and the material (e.g., glass, stainless steel) of the testing vessel 472. The information may be obtained at one time (e.g., prior to testing), over a period of time, periodically, or on some other basis. The information may be currently obtained data. In addition, or in the alternative, the data may be historical (e.g., data obtained from a prior field operation of the subterranean formation 110).

In step 782, a fluid 437 is provided that flows through the testing vessel 472. Specifically, the fluid 437 flows through the materials 475 within the testing vessel 472. The fluid 437 may be made up of multiple fluid components 427. Each fluid component 427 of a fluid 437 may be drawn from a fluid component source 428 using an associated injection system 438 and piping 488. The fluid 437 may be provided to flow through the testing vessel 472 using one or more injection systems 438 or an independent pumping system. The fluid components 427 of the fluid 437 may mix together naturally in a header 489 of the piping 488 and/or using a mixing module 465.

The composition of the fluid 437 may be known by a controller 404. The composition of the fluid 437 may include a specific identification (e.g., $CA^{2+}$, $HCO_3^-$) of each fluid component 427 and the amount (e.g., 10 ppm, mg/L) of each fluid component 427. For example, a user 451, including an associated user system 455, may communicate the composition of the fluid 437 to the controller 404. As another example, a controller 404, using one or more protocols 532 and/or one or more algorithms 533, may determine the composition of a fluid 437 that may be tested. In such a case, a controller 404 may communicate, using one or more protocols 532, this composition to a user 451 so that the user 451 may manipulate the appropriate fluid component sources 428 and associated injection systems 438 to attain the desired fluid 437. Alternatively, a controller 404 may manipulate, using one or more algorithms 533 and/or one or more protocols 532, the appropriate fluid component sources 428 and associated injection systems 438 to attain the desired fluid 437. The fluid 437 flows through the materials 475 in the testing vessel 472 continually over a period of time (e.g., hours, days, months).

In certain example embodiments, a controller 404 may also set and/or control the environment to which the materials 475 in the testing vessel 472 are exposed using one or more algorithms 533 and/or one or more protocols 532. For example, if a goal of the testing is to subject the materials 475 in the testing vessel 472 to conditions found in the subterranean formation 110, then the controller 404 may accordingly control factors such as the temperature and the pressure applied to the testing vessel 472.

In step 783, parameters associated with the testing vessel 472 and the post-testing fluid 457 are evaluated. Some or all of the parameters may be measured by one or more sensor devices 460. In addition, or in the alternative, some or all of the parameters may be calculated by a controller 404 using one or more algorithms 533 and/or one or more protocols 532. The measured parameters may be received from the sensor devices 460 by a controller 404. Examples of parameters that may be evaluated include, but are not limited to, a flow rate of the fluid 437 provided to the testing vessel 472, the flow rate of the post-testing fluid 457 in the post-testing fluid collection system 450, the pressure of an end of the testing vessel 472 receiving the fluid 437, the pressure of an opposite end of the testing vessel 472 discharging the post-testing fluid 457, a temperature of the materials 475 inside the testing vessel 472, permeability of the materials 475 in the testing vessel 472, and porosity of the materials 475 in the testing vessel 472.

As an example, a differential pressure value (e.g., comparing the pressure before the testing vessel 472 and the pressure after the testing vessel 472) may provide information as to a change in permeability, an accumulation of scale depositions 213, and/or plugging (e.g., scale deposition 213) of the material 475 within the testing vessel 472. In some cases, the measured parameters may be compared to expected values. In addition, or in the alternative, the measured parameters may be used as variables in one or more algorithms 533 to generate an output.

In step 784, a determination is made as to whether more data is needed. The need for more data may be based on one or more of a number of factors, including but not limited to time, trends, actual versus predicted values, and user preference. The determination may be made by a controller 404 using one or more algorithms 533 and/or one or more protocols 532. The determination may be based, at least in part, on information provided by a user 451, data collected from one or more sensor devices 460, results of one or more algorithms 533, and/or stored data 534 in the storage repository 531. If more data is needed, then the process reverts to step 782. If more data is not needed, then the process proceeds to step 785.

In step 785, a determination is made as to whether the fluid 437 needs to be adjusted. The determination may be made by a controller 404 based on the data obtained to that point and using one or more protocols 532 and/or algorithms 533. The decision to adjust the fluid 437 may be based on one or more of a number of factors, including but not limited to the size and/or amount of accumulated scale depositions 213 in the materials 475 in the testing vessel 472, the amount of time to that point that the materials 475 in the testing vessel 472 has been tested using the current fluid 437, the continued effectiveness of the proppant 112 in propping channels within the materials 475 in the testing vessel 472, and a change in the environment (e.g., pressure, temperature) of the materials 475 in the testing vessel 472. If the fluid 437 needs to be adjusted, then the process proceeds to step 786. If the fluid 437 does not need to be adjusted, then the process proceeds to step 787.

In step 786, the fluid 437 is adjusted. In other words, at least one aspect (e.g., an amount or concentration of a fluid component 427, removal of a fluid component 427, addition of a fluid component 427) of the fluid 437 is changed. The fluid 437 may be adjusted by a controller 404 (or an adjusting component thereof) using one or more algorithms 533 and/or one or more protocols 532. The controller 404 may also determine precisely how the fluid 437 should be adjusted. Alternatively, the fluid 437 may be adjusted by a user 451. In such a case, a controller 404 may provide instructions to the user 451 (or an associated user system 455) as to how the fluid 437 should be adjusted. When step 786 is finished, the process reverts to step 782. When this occurs, the testing vessel 472 and/or the materials 475 may need to be cleaned or otherwise processed based on the original or previous fluid 437 flowing therethrough. In addition, or in the alternative, the conditions (e.g., temperature, pressure) to which the testing vessel 472 is exposed when the adjusted fluid 437 flows through the materials 475 may need to change relative to the corresponding conditions in existence when the original or previous fluid 437 flowed therethrough.

In step 787, the materials 475 and scale in the testing vessel 472 and the post-testing fluid 457 in the post-testing fluid collection system 450 is evaluated. In other words, an evaluation is made as to the effectiveness of the fluid 437 used during testing based on the materials 475 and scale in the testing vessel 472 and the post-testing fluid 457 in the post-testing fluid collection system 450 after testing has concluded. The evaluation may be made by a controller 404 (or an evaluation component thereof) using one or more algorithms 533 and/or one or more protocols 532. Alternatively, the evaluation may be made by a user 451 based on information provided to the user 451 (including an associated user system 455) by a controller 404.

This step 787 may also include evaluating other aspects of the fractures 101 and areas adjacent to the wellbore 120. Examples of such other aspects may include, but are not limited to, the amount of scale depositions 213 that is required to induce a significant decrease in permeability of a fracture 101, whether mineral scale depositions 213 may block (e.g., by developing on proppant 112, rock, and/or the frac face 102) fractures 101 propped by proppant 112, the impact of scale depositions 213 on fluid flow at subsurface induced fractures 101, the impact on solid depositions (e.g., scale depositions 213), subsurface integrity, and/or flow assurance risks (e.g., plugging, fluid flow restriction) due to crushing, embedding, and/or clustering of proppant 112, the effectiveness and impact of the fluid 437 (including chemical additives (e.g., scale inhibitor)) on controlling solid (e.g., scale depositions 213) deposition risks, the impact of the size of proppant 112 on fluid flow assurance risks in subsurface fracture networks, scale removal for fractures 101 with rock presence propped by proppant 112, the effectiveness of pre-packed solid scale inhibitors, scale inhibitor adsorption and desorption from rock adjacent to fractures 101, scale squeeze treatment for hydraulically (or otherwise induced) fractures wells/reservoirs, the impact of the size of proppant 112 and water cut, the effectiveness and efficiency of subsurface chemical treatments, the impact of the fluid on specific types of scale depositions 213 (e.g., barite, calcium carbonate, iron oxide), and the impact of the fluid 437 on other types of solid deposition (e.g., asphaltene, sludge, fines). Any of these additional evaluations may be performed by a controller 404 (or an evaluation component thereof) using one or more protocols 532 and/or one or more algorithms 533.

In step 788, a recommendation about the fluid 437 is provided. The recommendation may be provided by a controller 404 (or a recommendation component thereof) using one or more protocols 532. The recommendation may be provided to one or more users 451 (including associated user systems 455) and/or the network manager 480. In one embodiment, a visual representation of the recommendation may be provided to one or more users 451 via an I/O device 616 such as a display, screen, etc. The recommendation about the fluid 437 may provide any level of detail about the fluid 437, including but not limited to the precise composition of the fluid 437, the amount of time that the fluid 437 is deemed to be effective, and the expected results (e.g., prevents accumulation of scale depositions 213, slows the accumulation of scale depositions 213 by 75%) of using the fluid 437. In certain example embodiments, the recommendation may be based on some of the other evaluations performed in step 787. When step 788 is complete, the process proceeds to the END step.

Figure 8A:
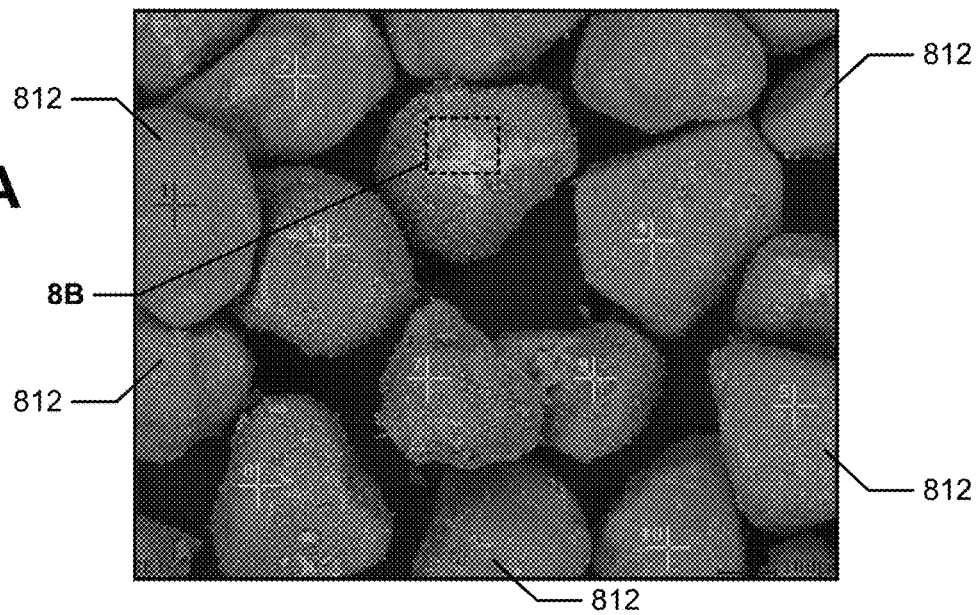
FIGS. 8A and 8B shows proppant with scale deposition according to certain example embodiments.
Figure 8B:
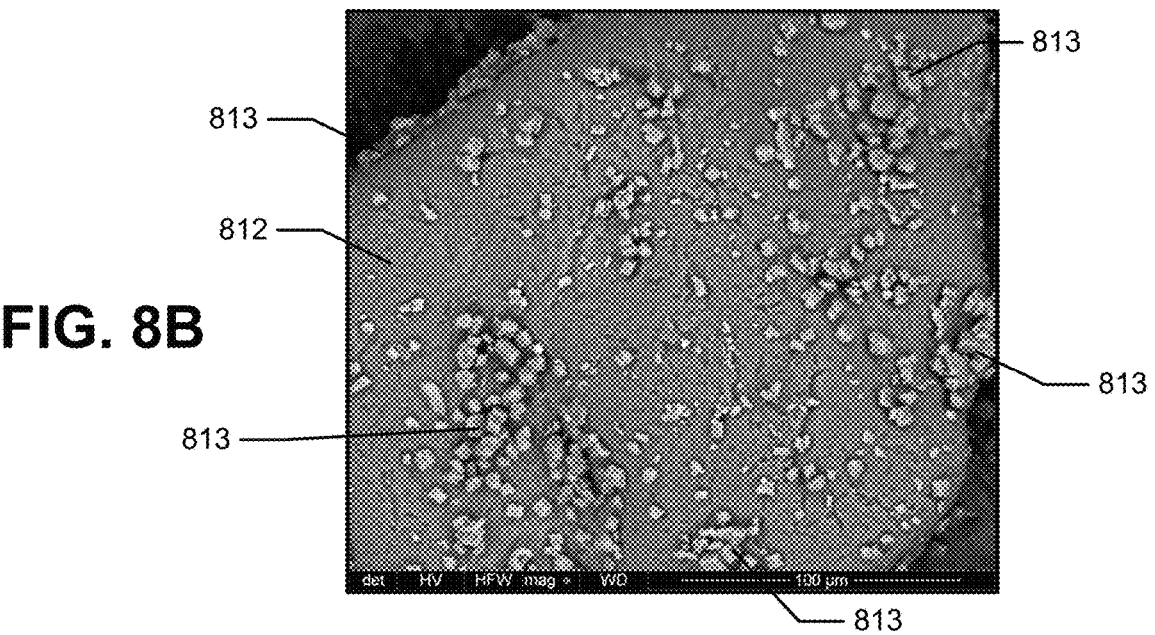

FIGS. 8A and 8B shows proppant 812 with scale deposition 813 according to certain example embodiments. Specifically, FIG. 8A shows a micrographic (SEM) view of proppant 812, and FIG. 8B shows a detailed micrographic view of one piece of the proppant 812 of FIG. 8A. Referring to FIGS. 1A through 8B, the proppant 812 shown in FIG. 8A are all irregularly shaped and have varying sizes relative to each other. Similarly, as shown in FIG. 8B, the scale deposition 813 on one piece of the proppant 812 is irregular in terms of their shape, size (e.g., length, width, height), and location. The proppant 812 and scale 813 are substantially the same as the proppant 112 and scale depositions 213 discussed above.

Figure 9:
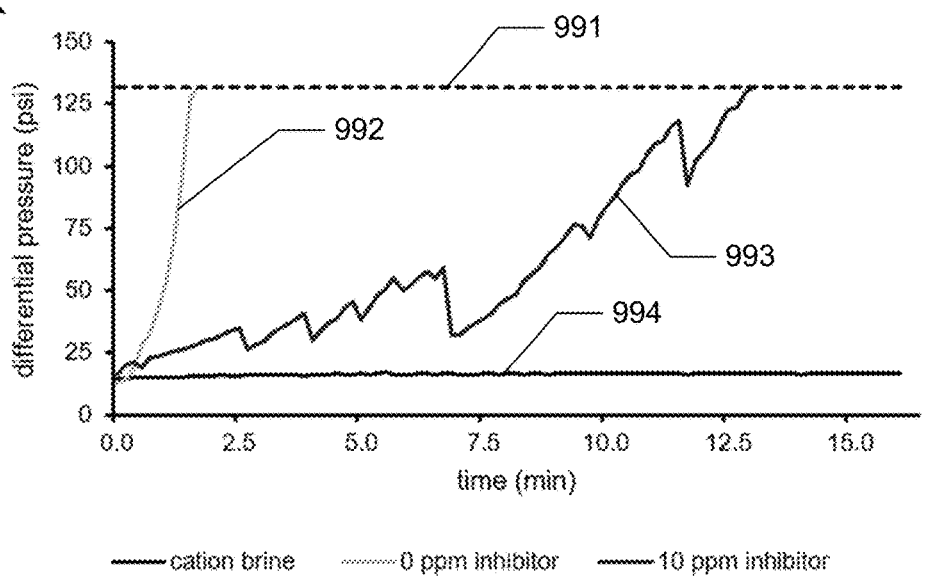
FIG. 9 shows a graph of differential pressure with respect to a testing vessel using a fluid over time according to certain example embodiments.

FIG. 9 shows a graph 997 of differential pressure with respect to a testing vessel 472 using a fluid 437 over time according to certain example embodiments. Referring to FIGS. 1A through 9, the graph 997 of FIG. 9 has four plots that are laid out with differential pressure (in psi) along the vertical axis and time (in minutes) along the horizontal axis. The differential pressure may be established by determining a difference between a pressure (measured by one sensor device 460) at an inlet of a testing vessel 472 and a pressure (measured by one sensor device 460) at an outlet of the same testing vessel 472. The fluid components 427 of the fluids 437 used for the plots in the graph 997 include 4000 mg/L of $Ca^{2+}$ and 6100 mg/L of $HCO_3^-$. The fluid components 427 of the fluids 437 may also include $Na^+$, $Cl^+$, $K^+$, and/or other ions. To generate the plots in the graph 997 of FIG. 9, the fluid 437 is run through a testing vessel 472 of a testing module 470, where the materials 475 in the testing vessel 472 include 40/70 mesh proppant (e.g., proppant 112). Elemental mapping (e.g., using EDS) reveals that the mesh proppant includes carbon, oxygen, aluminum, iron, and silicon.

Plot 991 represents the maximum differential pressure (representing substantial blockage) permitted in the testing module 470 at approximately 130 psi in this example. Plot 992 represents a fluid 437 that does not include any (0 ppm) scale inhibitor. With no scale inhibitor, the fluid 437 flowing through the materials 475 in the testing vessel 472 results in rapid scale deposition on proppants and blocks flow through the testing vessel 472 within 2 minutes. Plot 993 represents a fluid 437 that includes a fluid component 427 that is 10 ppm of scale inhibitor. With this small amount (10 ppm) of scale inhibitor, the fluid 437 flowing through the materials 475 in the testing vessel 472 results in somewhat slower scale deposition and blocks flow through the testing vessel 472 in approximately 13 minutes. Plot 994 represents a fluid 437 that includes a cation brine (e.g., a non-scaling brine). With the cation brine, the fluid 437 flowing through the materials 475 in the testing vessel 472 results in substantially no scale deposition, as the differential pressure remains constant at approximately 12 psi for the duration of the test (over 15 minutes).

Figure 10:
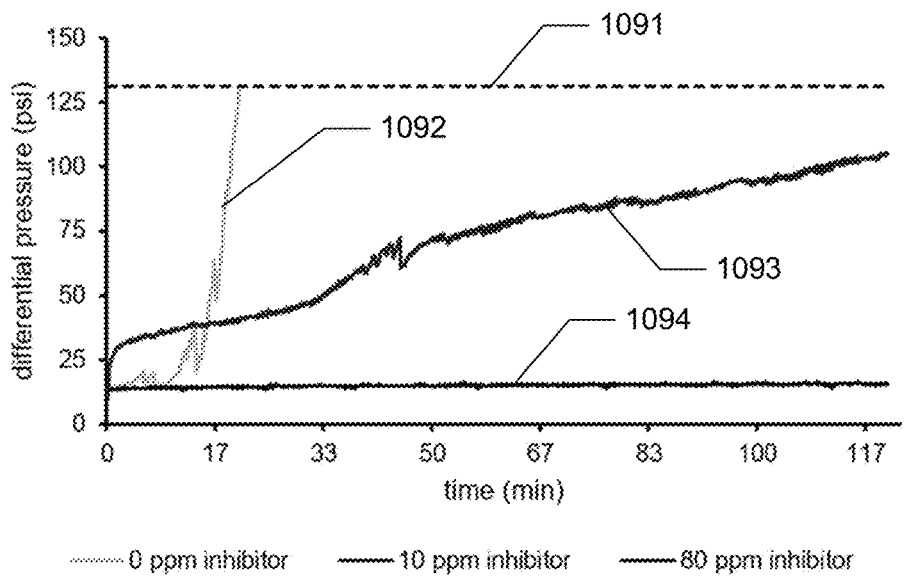
FIG. 10 shows a graph of differential pressure with respect to a testing vessel using another fluid over time according to certain example embodiments.

FIG. 10 shows a graph 1097 of differential pressure with respect to a testing vessel 472 using another fluid 437 over time according to certain example embodiments. Referring to FIGS. 1A through 10, the graph 1097 of FIG. 10 has four plots that are laid out with differential pressure (in psi) along the vertical axis and time (in minutes) along the horizontal axis. The differential pressure may be established by determining a difference between a pressure (measured by one sensor device 460) at an inlet of a testing vessel 472 and a pressure (measured by one sensor device 460) at an outlet of the same testing vessel 472. The fluid components 427 of the fluids 437 used for the plots in the graph 1097 include 400 mg/L of $Ca^{2+}$ and 610 mg/L of $HCO_3^-$. The fluid components 427 of the fluids 437 may also include $Na^+$, $Cl^+$, and $K^+$. This is $\frac{1}{10}^{th}$ the concentration of these fluid components 427 in the fluid 437 used in the plots for graph 997 of FIG. 9. To generate the plots in the graph 1097 of FIG. 10, the fluid 437 is run through a testing vessel 472 of a testing module 470, where the materials 475 in the testing vessel 472 include 40/70 mesh proppant (e.g., proppant 112). Elemental mapping (e.g., using EDS) reveals that the mesh proppant includes carbon, oxygen, aluminum, iron, and silicon. In other words, the mesh proppant used for the plots of FIG. 10 is the same as the mesh proppant used for the plots of FIG. 9.

Plot 1091 represents the maximum differential pressure (representing substantial blockage) permitted in the testing module 470 at approximately 130 psi in this example. Plot 1092 represents a fluid 437 that does not include any (0 ppm) scale inhibitor. With no scale inhibitor, the fluid 437 flowing through the materials 475 in the testing vessel 472 results in scale deposition and blocks flow through the testing vessel 472 within 22 minutes. This is significantly slower than plot 992 of FIG. 9, but the fastest among the plots in FIG. 19. Plot 1093 represents a fluid 437 that includes 10 ppm of scale inhibitor. With this small amount (10 ppm) of scale inhibitor, the fluid 437 flowing through the materials 475 in the testing vessel 472 results in somewhat slower scale deposition and blocks flow through the testing vessel 472 in well over 120 minutes. Plot 1094 represents a fluid 437 that includes 80 ppm of scale inhibitor. With this larger amount of scale inhibitor, the fluid 437 flowing through the materials 475 in the testing vessel 472 results in substantially no scale deposition, as the differential pressure remains constant at approximately 12 psi for the duration of the test (over 120 minutes).

Figure 11:
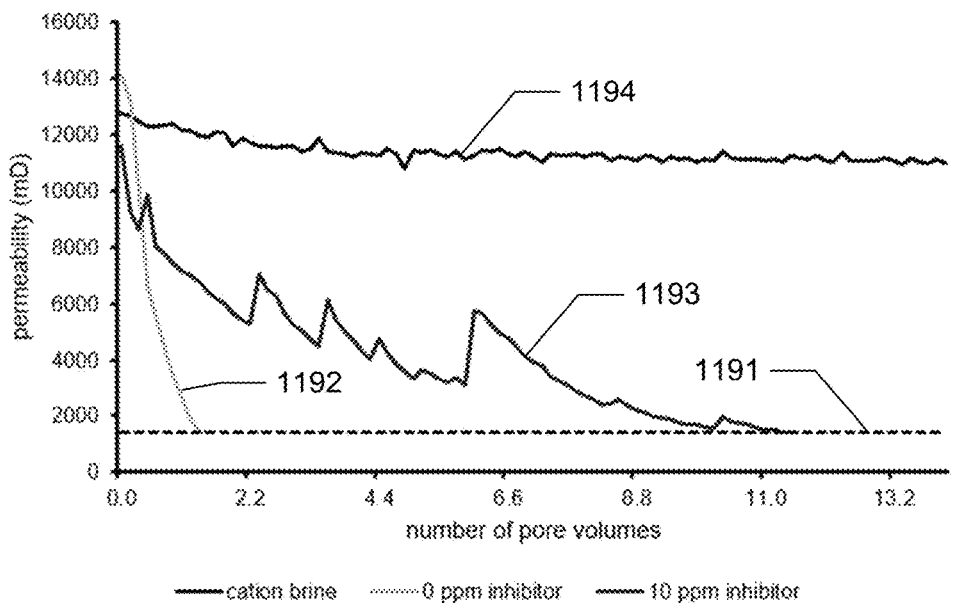
FIG. 11 shows a graph of permeability with respect to material in a testing vessel using the fluid of FIG. 9 over time according to certain example embodiments.

FIG. 11 shows a graph 1198 of permeability with respect to materials 475 in a testing vessel 472 using the fluid of FIG. 9 over time according to certain example embodiments. Referring to FIGS. 1A through 1I, the graph 1198 of FIG. 11 has four plots that are laid out with permeability (in mD) along the vertical axis and number of pore volumes along the horizontal axis. The fluid components 427 of the fluids 437 used for the plots in the graph 1198 include 4000 mg/L of $Ca^{2+}$ and 6100 mg/L of $HCO_3^-$, which is the same as the fluid 437 used for the plots in the graph 997 of FIG. 9. To generate the plots in the graph 1198 of FIG. 11, the fluid 437 is run through a testing vessel 472 of a testing module 470, where the materials 475 in the testing vessel 472 includes 40/70 mesh proppant (e.g., proppant 112) as used for the graphs of FIGS. 9 and 10 above.

Plot 1191 represents the minimum permeability (representing substantial blockage) permitted in the testing module 470 at approximately 1500 mD. Plot 1192 represents a fluid 437 that does not include any (0 ppm) scale inhibitor. With no scale inhibitor, the fluid 437 flowing through the materials 475 in the testing vessel 472 results in rapid scale deposition and blocks flow through the testing vessel 472 (reaches the minimum permeability) within 2 pore volumes. Plot 1193 represents a fluid 437 that includes 10 ppm of scale inhibitor. With this small amount (10 ppm) of scale inhibitor, the fluid 437 flowing through the materials 475 in the testing vessel 472 results in somewhat slower scale deposition and blocks flow through the testing vessel 472 in approximately 11 pore volumes.

Plot 1194 represents a fluid 437 that includes a cation brine. With the cation brine, the fluid 437 flowing through the materials 475 in the testing vessel 472 results in substantially no scale deposition, as the permeability remains constant at approximately 12000 mD for the duration of the test (over 14 pore volumes). One conclusion that may be drawn from the graph 1198 is that the scale inhibitor increases time required for blockage. Another conclusion that may be drawn from the graph 1198 is that the cation brine (without an anion brine) does not cause a significant change in permeability. In some alternative cases, a different type of non-scaling brine (e.g., DI water) may be used as the fluid 437 and generate similar results.

Figure 12:
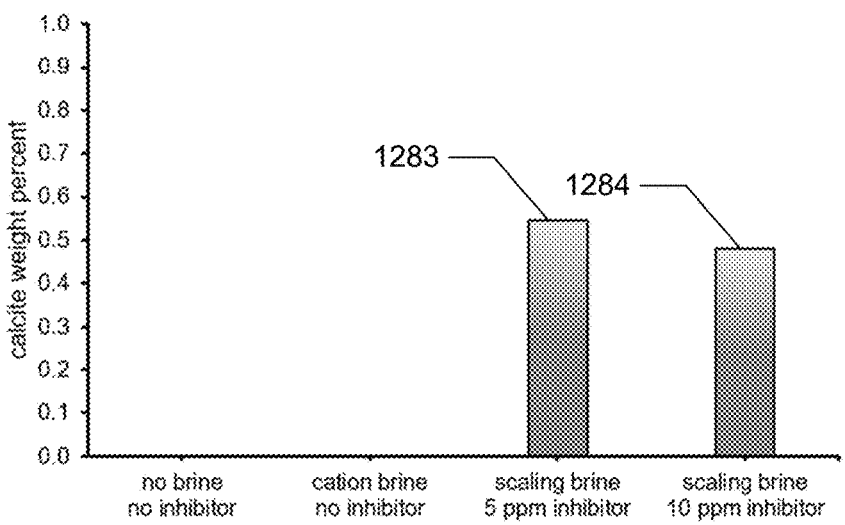
FIG. 12 shows a graph of calcite weight in proppant within a testing vessel after testing using the fluid of FIGS. 9 and 11 according to certain example embodiments.

FIG. 12 shows a graph 1296 of calcite weight in proppant (e.g., proppant 112) within a testing vessel 472 after testing using the fluid 437 of FIGS. 9 and 11 according to certain example embodiments. Referring to FIGS. 1A through 12, the graph 1296 of FIG. 12 shows two plots after testing conducted for FIGS. 9 and 11 above. The graph 1296 shows that when the fluid 437 used during testing of the materials 475 in the testing vessel 472 had no scale inhibitor, there was no calcite found in the proppant of those materials 475. By contrast, plots 1283 and 1284 in the graph 1296 show that when the fluid 437 used during testing of the materials 475 in the testing vessel 472 includes a scale inhibitor, there was calcite found in the proppant of those materials 475.

Plot 1283 shows that when the fluid includes 5 ppm of a scale inhibitor, the calcite weight in the proppant is approximately 0.5%, as measured by Quantitative X-Ray Diffraction (QXRD) analysis, at the end of the test, where the remaining water is blown out of the testing vessel 472 (e.g., using air), and the remaining proppants 112 with scale deposition 213 on it were dried before characterization. Plot 1284 shows that when the fluid 437 includes 10 ppm of a scale inhibitor, the calcite weight in the proppant is approximately 0.43%, as measured by QXRD analysis at the end of the test. A number of conclusions may be reached from graph 1296. For example, correlating to the graph 997 of FIG. 9, calcite is found in proppant for tests with increased differential pressure in the test module 470. Also, a calcite weight of 0.4% or greater, as measured by QXRD analysis at the end of the test, may cause a significant decrease in permeability. Finally, scale depositions (e.g., scale depositions 213) is the cause of blockage in the materials 475 within the testing vessel 472.

Figure 13:
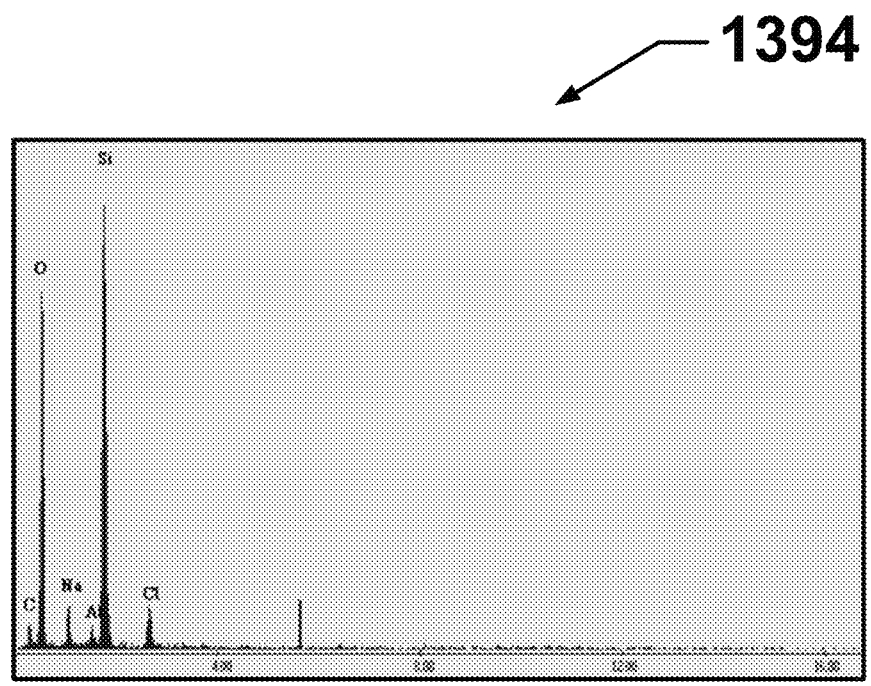
FIG. 13 shows a graph of elemental mapping by Energy Dispersive X-Ray Analysis (EDX) of proppant tested with the fluid of FIGS. 9, 11, and 12 that includes the cation brine.
Figure 14:
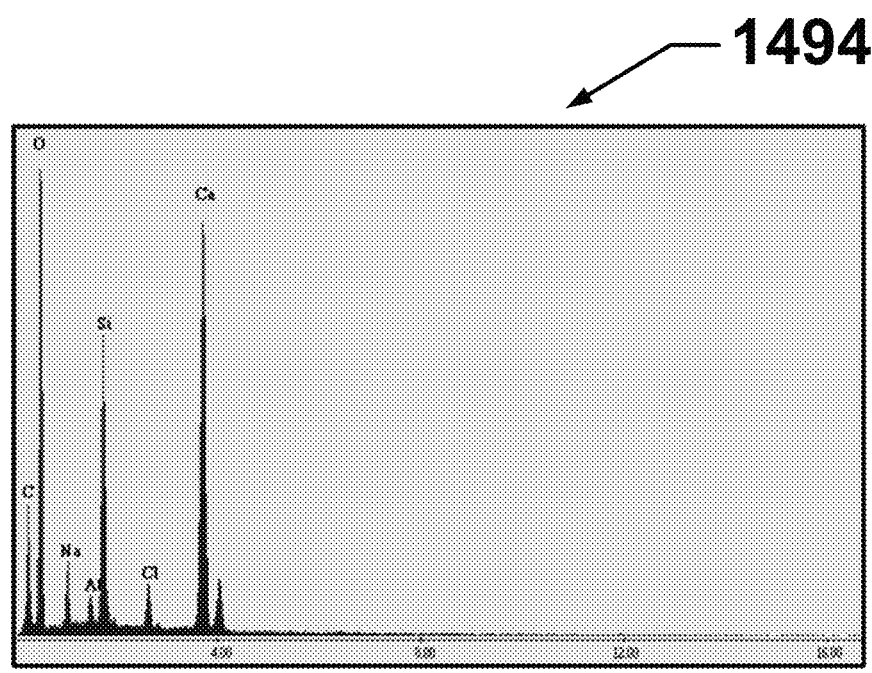
FIG. 14 shows a graph of elemental mapping by EDX of proppant tested with the fluid of FIGS. 9, 11, and 12 that includes the 10 ppm of scale inhibitor.

FIG. 13 shows a graph 1394 of elemental mapping by EDX of proppant tested with the fluid 437 of FIGS. 9, 11, and 12 that includes only the cation brine. FIG. 14 shows a graph 1494 of elemental mapping by EDX of proppant tested with the fluid 437 of FIGS. 9, 11, and 12 that includes the 10 ppm scale inhibitor and the mixture of cation and anion brines. Referring to FIGS. 1A through 14, the graph 1394 of FIG. 13 shows that the mesh proppant includes carbon, oxygen, sodium, aluminum, silicon, and chlorine. The graph 1494 of FIG. 14 shows that the mesh proppant includes carbon, oxygen, sodium, aluminum, silicon, chlorine, and calcium. In other words, the calcium peak in the graph 1494 of FIG. 14 emerges when scaling conditions are brought out in testing. The fluid 437 that includes only the cation brine in the graph 1394 of FIG. 13 contains $Ca^{2+}$ but no scaling tendency. These graphs of FIGS. 13 and 14 reinforce the conclusion that calcite is formed on the proppant only during scaling conditions, and that the formed scale depositions 213 are the cause of the permeability decrease.

Figure 15:
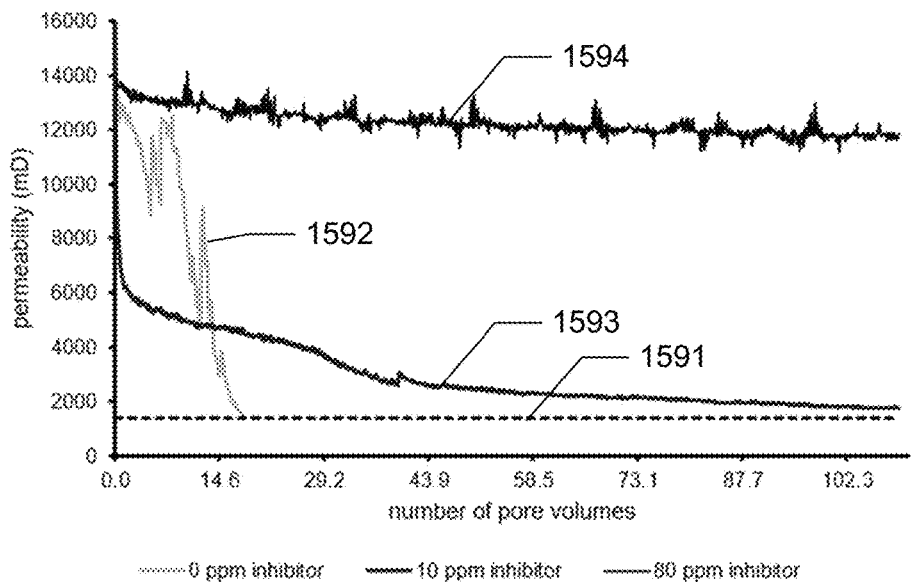
FIG. 15 shows a graph of permeability with respect to material in a testing vessel using the fluid of FIG. 10 over time according to certain example embodiments.

FIG. 15 shows a graph 1598 of permeability with respect to materials 475 in a testing vessel 472 using the fluid 437 of FIG. 10 over time according to certain example embodiments. Referring to FIGS. 1A through 15, the graph 1598 of FIG. 15 has four plots that are laid out with permeability (in mD) along the vertical axis and number of pore volumes along the horizontal axis. The fluid components 427 of the fluids 437 used for the plots in the graph 1598 include 400 mg/L of $Ca^{2+}$ and 610 mg/L of $HCO_3^-$, which is similar to the fluid 437 used for the plots in the graph 997 of FIG. 9. To generate the plots in the graph 1598 of FIG. 15, the fluid 437 is run through a testing vessel 472 of a testing module 470, where the materials 475 in the testing vessel 472 include 40/70 mesh proppant (e.g., proppant 152) as used for the graphs of FIGS. 9 and 10 above.

Plot 1591 represents the minimum permeability (representing substantial blockage) permitted in the testing module 470 at approximately 1500 mD in this example. Plot 1592 represents a fluid 437 that does not include any (0 ppm) scale inhibitor. With no scale inhibitor, the fluid 437 flowing through the materials 475 in the testing vessel 472 results in rapid scale deposition and blocks flow through the testing vessel 472 (reaches the minimum permeability) within approximately 16 pore volumes. Plot 1593 represents a fluid 437 that includes 10 ppm of scale inhibitor. With this small amount (10 ppm) of scale inhibitor, the fluid 437 flowing through the materials 475 in the testing vessel 472 results in a reduced rate of scale deposition and blocks flow through the testing vessel 472 in well over 110 pore volumes.

Plot 1594 represents a fluid 437 that includes 80 ppm of scale inhibitor added into the fluid 437 (in that case, a brine) that was used to generate plot 1592. With the elevated amount of scale inhibitor, the fluid 437 flowing through the materials 475 in the testing vessel 472 results in substantially no scale deposition, as the permeability remains constant at approximately 12000 mD for the duration of the test (over 110 pore volumes). One conclusion that may be drawn from the graph 1598 is that the scale inhibitor increases time required for blockage. Another conclusion that may be drawn from the graph 1598 is that the increase in the scale inhibitor to 80 ppm does not cause a significant change in permeability and prevented scale depositions 213 on the materials 475.

Figure 16:
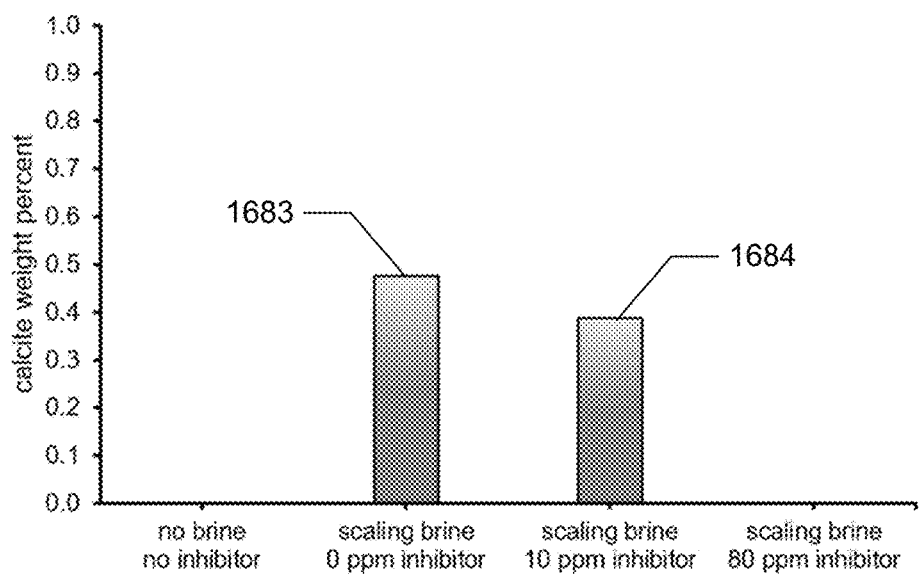
FIG. 16 shows a graph of calcite weight in proppant within a testing vessel after testing using the fluid of FIGS. 10 and 15 according to certain example embodiments.

FIG. 16 shows a graph 1696 of calcite weight in proppant (e.g., proppant 112) within a testing vessel 472 after testing using the fluid 437 of FIGS. 10 and 15 according to certain example embodiments. Referring to FIGS. 1A through 16, the graph 1696 of FIG. 16 shows two plots after testing conducted for FIGS. 10 and 15 above. The graph 1696 shows that when the fluid components 427 of the fluids 437 used during testing of the materials 475 in the testing vessel 472 had no brine or brine with an elevated (in this case, 80 ppm) amount of scale inhibitor, there was no calcite found in the proppant of those materials 475. By contrast, plots 1683 and 1684 in the graph 1696 show that when the fluid used during testing of the materials 475 in the testing vessel 472 includes a brine and little or no scale inhibitor, there was calcite found in the proppant of those materials 475.

Plot 1683 shows that when the fluid 437 includes a scaling brine (e.g., a 1:1 ratio cation brine-anion brine mixture) and 0 ppm of a scale inhibitor, the calcite weight in the proppant is approximately 0.5%. Plot 1684 shows that when the fluid 437 includes scaling brine and 10 ppm of a scale inhibitor, the calcite weight in the proppant is approximately 0.40%.

A number of conclusions may be reached from graph 1696. For example, correlating to the graph 1097 of FIG. 10, calcite is found in proppant for tests with increased differential pressure in the test module 470. Also, a calcite weight of 0.4% or greater may cause a significant decrease in permeability (from ~14000 mD to 1500 mD or lower). Finally, scale depositions (e.g., scale depositions 213) are the cause of blockage in the materials 475 within the testing vessel 472.

Figure 17:
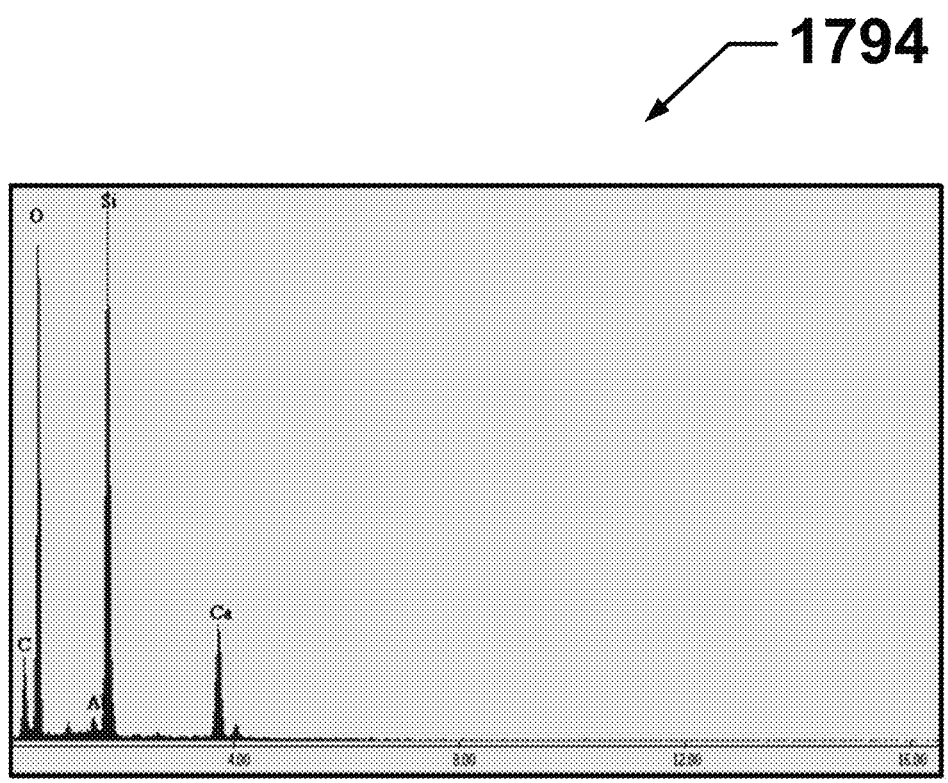
FIG. 17 shows a graph of elemental mapping by EDX of proppant tested with the fluid of FIGS. 10, 15, and 16 that includes the cation brine and 0 ppm of scale inhibitor.
Figure 18:
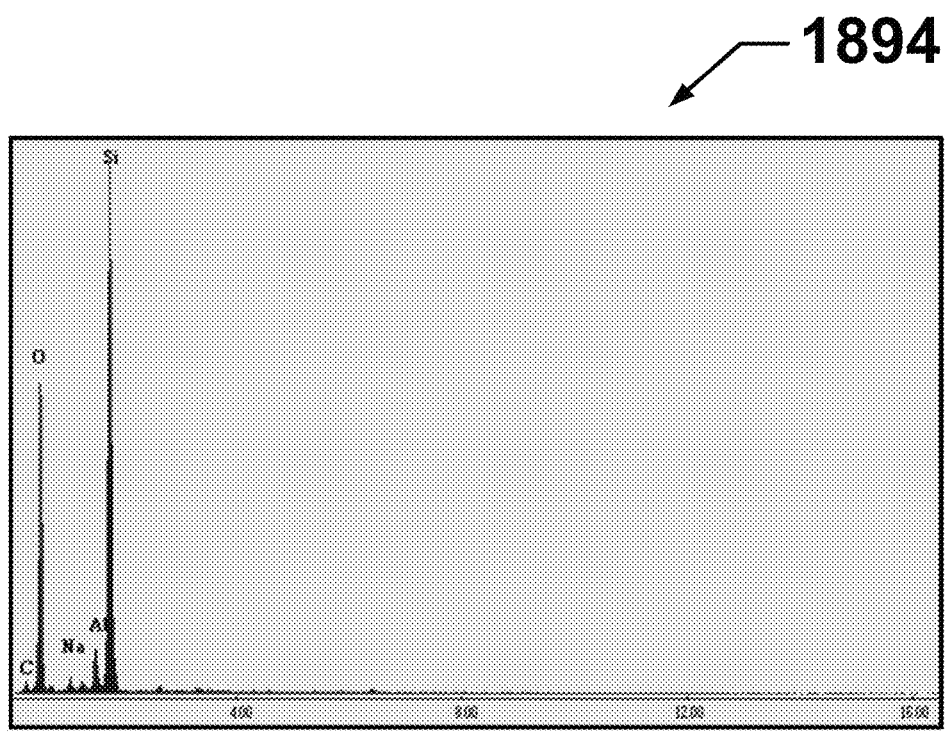
FIG. 18 shows a graph of elemental mapping by EDX of proppant tested with the fluid of FIGS. 10, 15, and 16 that includes the cation brine and 80 ppm of scale inhibitor.

FIG. 17 shows a graph 1794 of elemental mapping by EDX of proppant tested with the fluid 437 of FIGS. 10, 15, and 16 that includes the cation brine and 0 ppm of the scale inhibitor. FIG. 18 shows a graph 1894 of elemental mapping by EDX of proppant tested with the fluid 437 of FIGS. 10, 15, and 16 that includes the cation brine and 80 ppm of scale inhibitor. Referring to FIGS. 1A through 18, the graph 1794 of FIG. 17 shows that the mesh proppant includes carbon, oxygen, aluminum, silicon, and calcium. The graph 1894 of FIG. 18 shows that the mesh proppant includes carbon, oxygen, sodium, aluminum, and silicon. In other words, the calcium peak in the graph 1794 of FIG. 17 emerges when scaling conditions are brought out in testing. The proppant 112 from the test with the fluid 437 that includes the cation brine and 80 ppm of scale inhibitor in the graph 1894 of FIG. 18 has no significant calcium. These graphs of FIGS. 17 and 18 reinforce the conclusion that calcite is formed on the proppant only during scaling conditions and caused the permeability decrease in the proppant.

Figure 19:
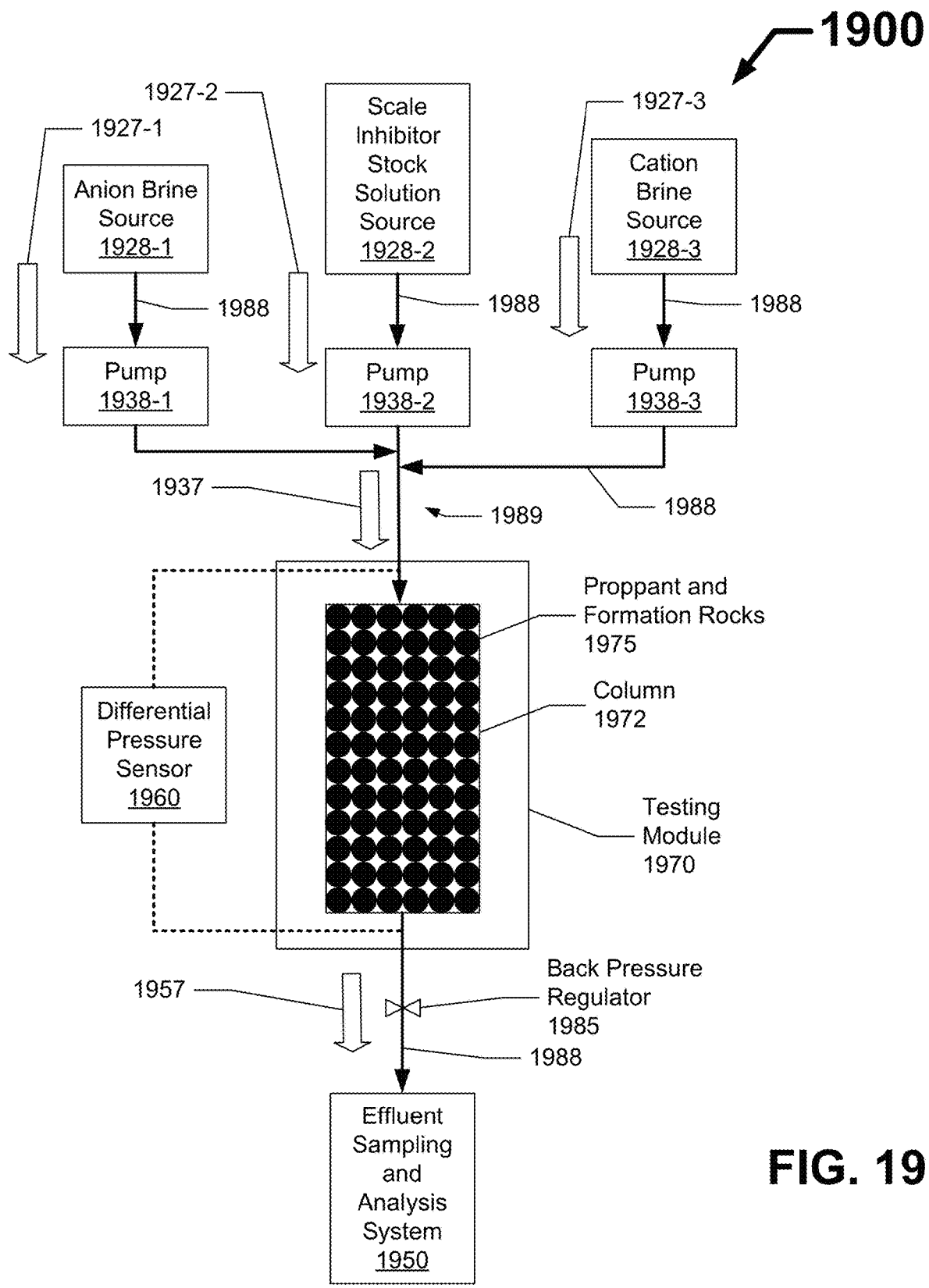
FIG. 19 shows another diagram of part of a testing system for assessing and reducing subsurface deposition of scales and/or other solids according to certain example embodiments.

FIG. 19 shows another diagram of part of a testing system 1900 for assessing and reducing subsurface deposition of scales and/or other solids according to certain example embodiments. Referring to FIGS. 1A through 19, the portion of the testing system 1900 shown in FIG. 19 may be substantially the same as the corresponding components of the testing system 400 of FIG. 4. For example, the portion of the testing system 1900 of FIG. 19 includes three fluid component sources 1928, three fluid components 1927, three injection systems 1938, piping 1988, a sensor device 1960, a valve 1988, a testing module 1970 with a testing vessel 1972 having materials 1975 disposed therein, and a post-testing fluid collection system 1950, which are substantially similar to the component sources 428, the fluid components 427, the injection systems 438, the piping 488, the sensor devices 460, the valves 488, the testing module 470, the testing vessel 472, the materials 475, and the post-testing fluid collection system 450 of FIG. 4.

The first fluid component source 1928 of FIG. 19 is in the form of an anion brine source 1928-1, which releases an anion brine 1927-1 (a form of a fluid component 1927) that is moved toward the testing module 1970 by a pump 1938-1 (a form of an injection system 1938) through piping 1988. The second fluid component source 1928 of FIG. 19 is in the form of a scale inhibitor stock solution source 1928-2, which releases a scale inhibitor stock solution 1927-2 (another form of a fluid component 1927) that is moved toward the testing module 1970 by a pump 1938-2 (another form of an injection system 1938) through piping 1988. The third fluid component source 1928 of FIG. 19 is in the form of a cation brine source 1928-3, which releases a cation brine 1927-3 (yet another form of a fluid component 1927) that is moved toward the testing module 1970 by a pump 1938-3 (yet another form of an injection system 1938) through piping 1988.

The three fluid component sources 1928 combine at a part of the piping 1988 upstream of the testing module 1970 that forms a header 1989. When the three fluid component sources 1928 combine in the piping 1988, a resulting fluid 1937, which includes the anion brine 1927-1, the scale inhibitor stock solution 1927-2, and the cation brine 1927-3, flows through some of the piping 1988 to the testing module 1970. At the testing module 1970, the fluid 1937 flows through the testing vessel 1972, which in this case is in the form of a column 1972. The column 1972 is filled (e.g., fully (packed), partly) with materials 1975, which in this case are in the form of proppant and formation rocks (e.g., cuttings).

The differential pressure sensor 1960 (a form of a sensor device 460) of the system 1900 measures the difference between the pressure of the fluid 1937 entering the column 1972 and the pressure of the post-testing fluid 1957 (substantially the same as the post-testing fluid 457 of FIG. 4) exiting the column 1972. A controller (not shown, but substantially similar to a controller 404 of FIG. 4) can control the valve 1988 in the form of a back pressure regulator 1988 if the values measured by the differential pressure sensor 1960 exceed a certain value or fall outside a range of values. The post-testing fluid 1957, upon exiting the testing module 1970, flows through some of the piping 1988 to the effluent sampling and analysis system 1950, which is a form of a post-testing fluid collection system 450.

Figure 20A:
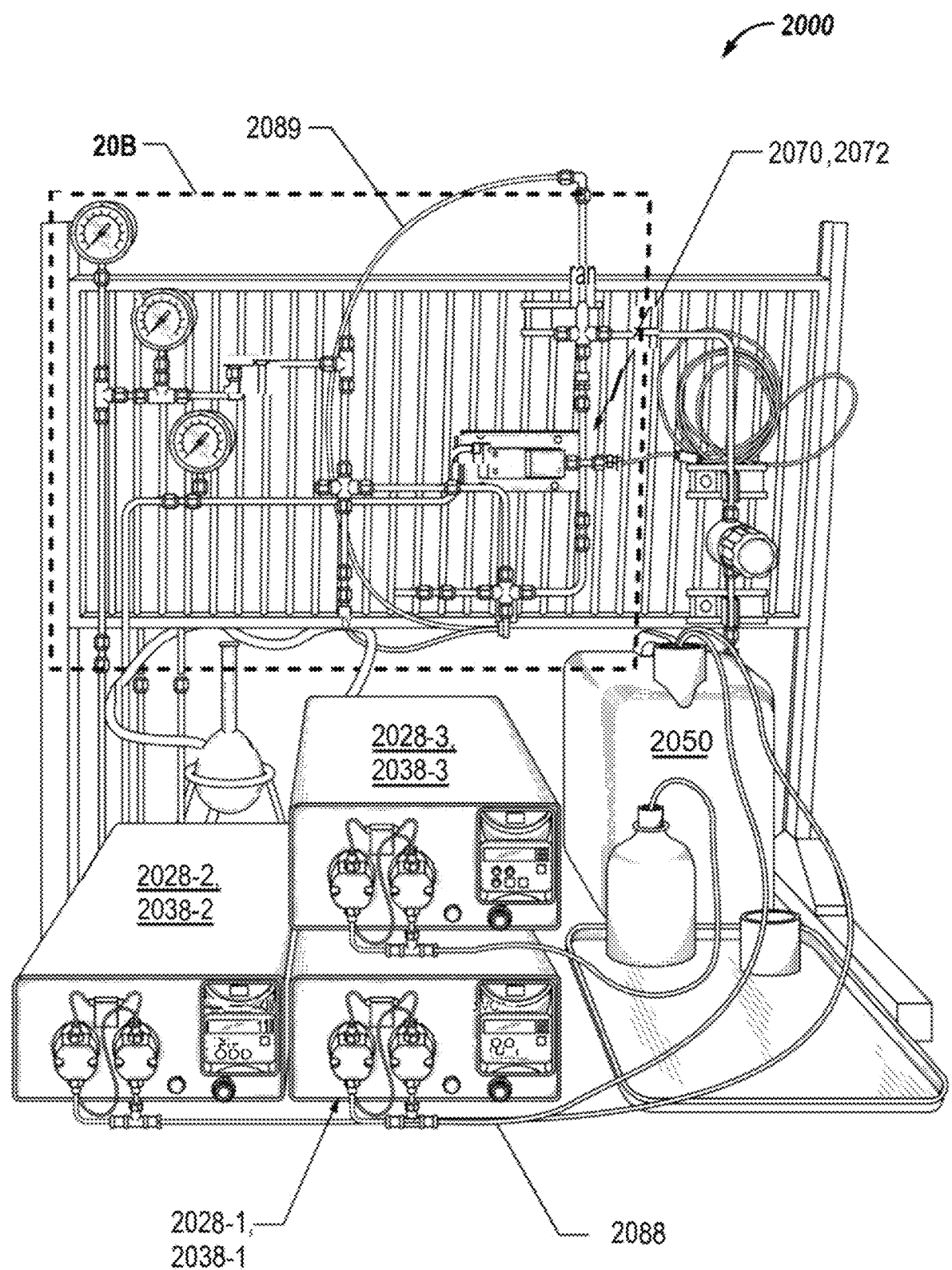
FIGS. 20A through 20C show an image of a testing system that is modeled after the testing system of FIG. 19 according to certain example embodiments.
Figure 20B:
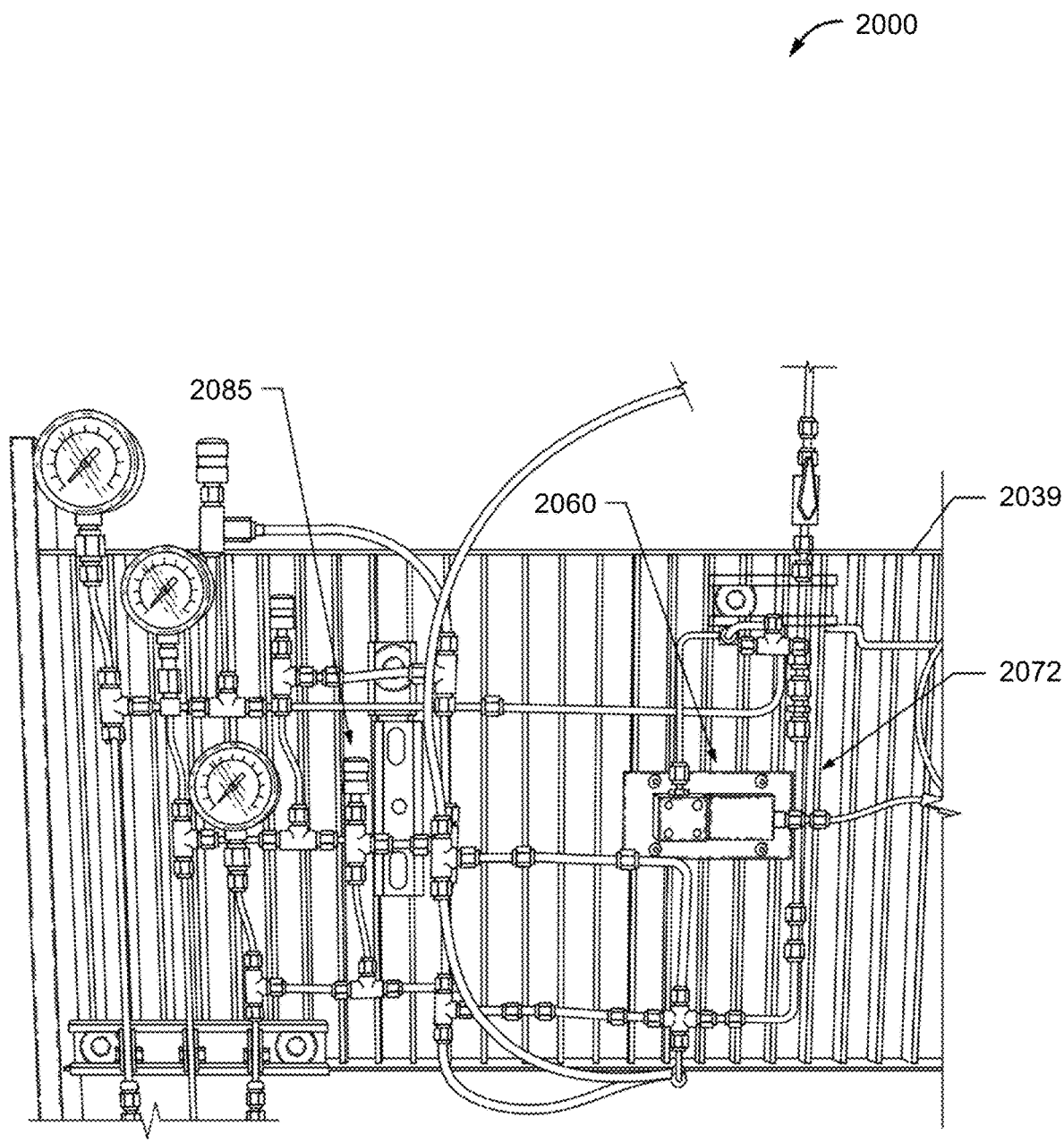
Figure 20C:
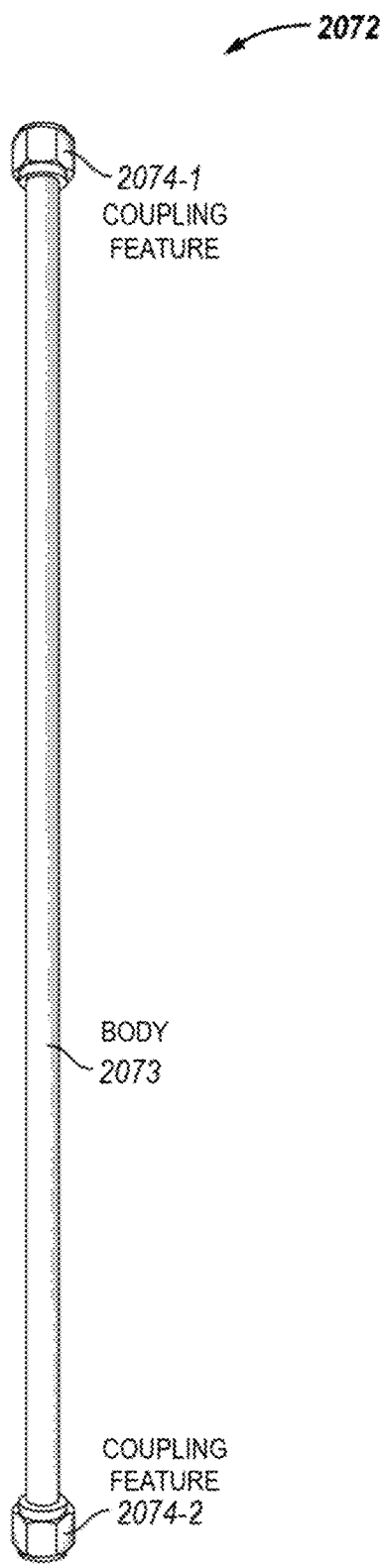

FIGS. 20A through 20C show an image of a testing system 2000 that is modeled after the testing system 1900 of FIG. 19 according to certain example embodiments. Specifically, FIG. 20A shows a front view of the testing system 2000. FIG. 20B shows a detailed view of part of the testing system 2000. FIG. 20C shows a front view of the column 2172 of the testing system 2000. Referring to FIGS. 1A through 20C, the testing system 2000 of FIGS. 20A through 20C includes three fluid component sources 2028, three injection systems 2038, piping 2088, a sensor device 2060, a pressure relief valve 2085, a testing module 2070 with a column 2072 (a form of testing vessel 472) having materials (e.g., materials 1975, hidden from view) disposed therein, and a post-testing fluid collection system 2050. These components of the testing system 2000 are substantially similar to the corresponding components of the testing system 1900 of FIG. 19 and the testing system 400 of FIG. 4.

The first fluid component source 2028 of FIG. 20A is in the form of an anion brine source 2028-1, which releases an anion brine (a form of a fluid component 427) that is moved toward the testing module 2070 by a pump 2038-1 (a form of an injection system 438) through piping 2088. The second fluid component source 2028 of FIG. 20A is in the form of a water source 2028-2, which releases a water solution (another form of a fluid component 427) that is moved toward the testing module 2070 by a pump 2038-2 (another form of an injection system 438) through piping 2088. In some cases, the water solution includes a scale inhibitor. The third fluid component source 2028 of FIG. 20A is in the form of a cation brine source 2028-3, which releases a cation brine (yet another form of a fluid component 427) that is moved toward the testing module 2070 by a pump 2038-3 (yet another form of an injection system 438) through piping 2088.

The three fluid component sources 2028 combine at a part of the piping 2088 upstream of the testing module 2070 that forms a header 2089. When the three fluid component sources 2028 combine in the piping 2088, a resulting fluid (similar to the resulting fluid 437 of FIG. 4), which includes the anion brine, the water solution, and the cation brine, flows through some of the piping 2088 to the testing module 2070. At the testing module 2070, the fluid flows through the column 2072 (a form of testing vessel 472). The column 2072 is filled (e.g., fully (packed), partly) with materials (hidden from view), such as proppant and formation rocks (e.g., cuttings).

The differential pressure sensor 2060 (a form of a sensor device 460) of the system 2000 measures the difference between the pressure of the fluid entering the column 2072 and the pressure of the post-testing fluid (substantially the same as the post-testing fluid 457 of FIG. 4) exiting the column 2072. The pressure relief valve 2085 can be adjusted when the values measured by the differential pressure sensor 2060 exceed a certain value or fall outside a range of values. The post-testing fluid, upon exiting the column 2072, flows through some of the piping 2088 to the post-testing fluid collection system 2050, which is a form of the post-testing fluid collection system 450 of FIG. 4. In this case, the column 2072, the differential pressure sensor 2060, the pressure relief valve 2085, and some of the piping 2088, including the header 2089, are mounted to a frame 2039 that is substantially vertical.

As discussed above, FIG. 20C shows an image of the column 2072 of the testing system 2000 according to certain example embodiments. The column 2072 in this case has a body 2073 having a cylindrical shape. The body 2073 in this case has an approximate length of 18 inches. In certain example embodiments, the length of the body 2073 of the column 2072 can range from 4 inches to 36 inches. The body 2073 of the column 2072 in this example is substantially cylindrical in shape with an inner diameter (ID) of approximately ⅛ inches and an approximate outside diameter (OD) of approximately ⅜ inch. In alternative embodiments, the body 2073 of the column 2072 can have other shapes that are not fully or partially cylindrical. In certain example embodiments, the ID of the body 2073 of the column 2072 can range from ⅛ inches to 2.5 inches, and the OD of the body 2073 of the column 2072 can range from ¼ inch to 3 inches.

The body 2073 of the column 2072 is designed to withstand the conditions (e.g., pressure, flow rate, acidity) at which the materials (e.g., materials 1975) disposed therein and the fluid (e.g., fluid 1937) flowing therethrough are tested. The body 2073 of the column 2072 can be made of one or more of any of a number of suitable materials, including but not limited to stainless steel, plexiglass, ceramics, PEEK, PTFE, corrosion resistant alloys (CRAs). In certain example embodiments, the inner walls of the body 2073 of the column 2072 may be featureless and smooth. The thickness of the wall of the body 2073 may be configured (e.g., $1/16^{th}$ inch thick to ½ inch thick) to withstand a minimum pressure (e.g., 500 psig), a normal testing pressure (e.g., 3000 psig), and/or a maximum pressure (e.g., 6000 psig) that may be used during testing. In some cases, the thickness of the wall of the body 2073 may be configured to be substantially uniform along its length.

The column 2072 can include one or more coupling features 2074 that are configured to couple the column 2072 to one or more other components (e.g., piping 1988) of a testing system (e.g., testing system 1900). For example, in this case, the column 2072 has two coupling features 2074, where one coupling feature 2074-1 is located toward one end of the body 2073 of the column 2072, and where the other coupling feature 2074-2 is located toward the opposite end of the body 2073 of the column 2072. In this case, the coupling features 2074 are configured substantially identically to each other in the form of threaded nuts that mate with complementary threads disposed on the outer perimeter of adjacent piping (e.g., piping 1988). In alternative embodiments, one or more of the coupling features 2074 may have a different configuration. Further, in alternative embodiments, the configuration of one coupling feature 2074 of the column 2072 can differ from the configuration of one or more of the other coupling features 2074 of the column 2072. In any case, the coupling features 2074 are configured to couple to one or more other components of the testing system so that the desired testing conditions (e.g., pressure, flow rate) can be maintained.

In any case, one or more of the dimensions (e.g., the length, the outer diameter, the thread size) of a coupling feature 2074 can change based on one or more of a number of factors, including but not limited to the characteristics (e.g., outer diameter, length) of the body 2073 of the column 2072 and the characteristics (e.g., outer diameter, thread size) of another component (e.g., piping 1988) of the testing system (e.g., testing system 1900) to which the a coupling feature 2074 of the column 2072 is configured to be coupled. For example, a coupling feature 2074 have an outer diameter that ranges from approximately ¼" to approximately 3" and a length that ranges from approximately ½" to approximately 1.5". In certain example embodiments, a coupling feature 2074 has a substantially uniform outer surface.

As discussed above, an example testing system (e.g., testing system 400, testing system 1900, testing system 2000) can be used for one or more of a number of purposes using one or more of a number of analytical methods. The following Table 1 provides non-exclusive examples of some of these analytical methods and corresponding purposes.

TABLE 1

| ANALYTICAL METHOD | PURPOSE |
| --- | --- |
| Scanning Electron Microscope (SEM) | Visualize morphology and perform elemental analysis for materials (cutting, core, proppant, scales, etc.) |
| Quantitative X-ray Diffraction (QXRD) | Measure crystal structure and confirm scale type and material composition |
| Differential Pressure | Monitor pressure difference which is an indication of scale deposition on materials inside packed column |
| Photograph | Overview of scale formation on materials |
| Inductively coupled plasma-optical emission spectrometry (ICP-OES) | Elemental analysis for fluid samples |
| Ion Chromatography (IC) | Analyze water/brine composition |
| pH probe | Measure pH in water/brine samples |
| X-ray Fluorescence (XRF) | Elemental analysis |
| Dissolution test | Solid characterization |

TABLE 1-continued

| ANALYTICAL METHOD | PURPOSE |
|---|---|
| X-ray mapping | Evaluate element distribution |
| Inductively coupled plasma-mass spectrometry (ICP-MS) | Elemental analysis for fluid samples |
| Particle size analyzer | Analyze particle size and distribution |
| Stable isotope analysis | Measure stable isotope ratio |

Example embodiments may be used for being representative of downhole conditions to determine one or more fluids (e.g., chemical products) that may inhibit or prevent the development of scale on proppant rock, and/or frac faces within induced fractures adjacent to a wellbore in a producing volume in a subterranean formation. Example embodiments may be used to fully or partially automate the process of generating different fluids from fluid components, providing the fluid that flows through materials in a testing vessel of a testing module, and evaluating the effectiveness of the fluid at reducing scale deposition or the accumulation thereof. Example embodiments may also communicate the results of an evaluation of a fluid, determine alternative fluids that may be more effective, generate those alternative fluids, and evaluate those alternative fluids during and after testing. Using example embodiments, the materials that are tested are subjected to conditions that are representative of those of a fractured subterranean formation. Example embodiments may provide a number of benefits. Such benefits may include, but are not limited to, ease of use, extending the life of a producing well, optimize use of proppant in fractures, flexibility, configurability, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for evaluating a fluid to reduce a deposition of a solid within a fractured subterranean rock formation, the method comprising:
   obtaining information about a plurality of materials inside of a testing vessel, wherein the plurality of materials is designed to be representative of the fractured subterranean rock formation during production, wherein the fractured subterranean rock formation is unconventional, wherein the information comprises a permeability of the plurality of materials, and wherein the plurality of materials comprises proppant, rock, and formation water;
   providing the fluid that flows through the plurality of materials inside the testing vessel for a period of time, wherein the testing vessel is subjected to conditions designed to be representative of downhole conditions of the fractured subterranean rock formation during production;
   evaluating the plurality of materials using the information and measurements associated with the fluid flowing through the plurality of materials to characterize the deposition of the solid on at least some of the plurality of materials after the period of time in order to determine whether the fluid improves production of a subterranean resource from the fractured subterranean rock formation;
   determining that the fluid is ineffective at reducing the deposition of the solid; and
   identifying a second fluid to reduce the deposition of the solid based on evaluating the plurality of materials after interacting with the fluid in the testing vessel.

2. The method of claim 1, wherein the fluid comprises a cation brine, an anion brine, or both.

3. The method of claim 1, further comprising:
   generating the second fluid;
   providing the second fluid that flows through the plurality of materials inside the testing vessel for an additional period of time; and
   evaluating the plurality of materials to characterize the deposition of the solid on the at least some of the materials after the additional period of time in order to determine whether the second fluid improves production of the subterranean resource from the fractured subterranean rock formation.

4. The method of claim 1, further comprising:
   removing a plurality of fluid components from a plurality of fluid component sources using a plurality of injection systems; and
   injecting the plurality of fluid components into a common vessel to form the fluid.

5. The method of claim 1, further comprising:
   evaluating a post-testing fluid that comprises the fluid after flowing through the plurality of materials in the testing vessel.

6. The method of claim 1, further comprising:
   providing a recommendation about the fluid after evaluating the plurality of materials.

7. The method of claim 1, further comprising:
   controlling the conditions to which the testing vessel is subjected in a testing module.

8. The method of claim 1, wherein the solid comprises a scale deposition, asphaltene, sludge, fines, or any combination thereof.

9. A system for evaluating a fluid to reduce a deposition of a solid within a fractured subterranean rock formation, the system comprising:
   a testing module comprising a testing vessel, wherein the testing vessel is configured to receive a plurality of materials, wherein the plurality of materials is designed to be representative of the fractured subterranean rock formation during production, wherein the fractured subterranean rock formation is unconventional, wherein the testing module is configured to provide an environment that is representative of downhole conditions during production at the fractured subterranean rock formation on the testing vessel, wherein the testing module is further configured to provide the fluid that flows through the plurality of materials in the testing vessel for a period of time, wherein information comprising a permeability of the plurality of materials and measurements associated with the fluid flowing through the plurality of materials are used to characterize the deposition of the solid on at least some of the plurality of materials after the period of time in order to determine whether the fluid improves production of a subterranean resource from the fractured subterranean rock formation, and wherein the plurality of materials comprises proppant, rock, and formation water; and a plurality of sensor devices configured to measure a plurality of parameters associated with the testing vessel while the fluid flows through the plurality of materials, wherein the plurality of parameters comprises an amount of the deposition of the solid on the plurality of materials, and wherein the solid comprises a scale.

10. The system of claim 9, further comprising:
a controller communicably coupled to the plurality of sensor devices, wherein the controller is configured to evaluate the fluid using measurements made by the plurality of sensor devices.

11. The system of claim 9, wherein the plurality of parameters comprises a differential pressure around the testing vessel.

12. The system of claim 10, wherein the plurality of parameters comprises a temperature of the testing vessel.

13. The system of claim 9, further comprising:
a plurality of fluid component sources that contain a plurality of fluid components, wherein each of the plurality of fluid component sources contains a fluid component of the fluid; and
a plurality of injection systems, wherein each of the plurality of injection systems is configured to move each fluid component toward the testing module.

14. The system of claim 13, further comprising:
a header located between the plurality of injections systems and the testing vessel, wherein the plurality of fluid components mix together inside the header to form the fluid.

15. The system of claim 13, further comprising:
a mixing module located between the plurality of injections systems and the testing vessel, wherein the mixing module mixes the plurality of fluid components to form the fluid.

16. The system of claim 9, further comprising:
a post-testing fluid collection system that is configured to receive a post-testing fluid from the testing module, wherein the post-testing fluid comprises the fluid after the fluid flows through the plurality of materials in the testing vessel.

17. The system of claim 9, wherein the testing vessel is removable from the testing module.

18. The system of claim 9, further comprising the fluid for flowing through the plurality of materials in the testing vessel.

19. A method for evaluating a fluid to reduce a deposition of a solid within a fractured subterranean rock formation, the method comprising:
obtaining information about a plurality of materials inside of a testing vessel, wherein the plurality of materials is designed to be representative of the fractured subterranean rock formation during production, wherein the fractured subterranean rock formation is unconventional, wherein the information comprises a permeability of the plurality of materials, and wherein the plurality of materials comprises proppant, rock, and formation water;
removing a plurality of fluid components from a plurality of fluid component sources using a plurality of injection systems;
injecting the plurality of fluid components into a common vessel to form a fluid;
providing the fluid that flows through the plurality of materials inside the testing vessel for a period of time, wherein the testing vessel is subjected to conditions designed to be representative of downhole conditions of the fractured subterranean rock formation during production; and
evaluating the plurality of materials using the information and measurements associated with the fluid flowing through the plurality of materials to characterize the deposition of the solid on at least some of the plurality of materials after the period of time in order to determine whether the fluid improves production of a subterranean resource from the fractured subterranean rock formation.

* * * * *